US012716364B1

(12) United States Patent
Morris et al.

(10) Patent No.: US 12,716,364 B1
(45) Date of Patent: Aug. 25, 2026

(54) MOBILE ELECTRIC POWER GENERATION WITH LATERAL SIDE COMBUSTION AIR SUPPLY

(71) Applicant: Typhon Technology Solutions (U.S.), LLC, The Woodlands, TX (US)

(72) Inventors: Jeffrey G. Morris, The Woodlands, TX (US); Matthew Michel, Shoreview, MN (US); Dave Routhier, Winnipeg (CA); Thomas Wilson Robertson, Mandeville, LA (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 0 days.

(21) Appl. No.: 19/290,027

(22) Filed: Aug. 4, 2025

(51) Int. Cl.
*F01D 15/10* (2006.01)
*F01D 25/28* (2006.01)
*F01D 25/30* (2006.01)

(52) U.S. Cl.
CPC ............ *F01D 15/10* (2013.01); *F01D 25/28* (2013.01); *F01D 25/30* (2013.01); *F05D 2220/76* (2013.01); *F05D 2230/51* (2013.01)

(58) Field of Classification Search
CPC .......... F01D 15/10; F01D 25/28; F01D 25/30; F05D 2220/76; F05D 2230/51
See application file for complete search history.

(56) References Cited

U.S. PATENT DOCUMENTS

| | | | |
|---|---|---|---|
| 2009/0044536 A1 | 2/2009 | Nakano et al. | |
| 2015/0381013 A1 | 12/2015 | Davies et al. | |
| 2016/0076447 A1 | 3/2016 | Merlo et al. | |
| 2021/0025324 A1 | 1/2021 | Morris et al. | |
| 2021/0180517 A1 | 6/2021 | Zhou et al. | |
| 2023/0349325 A1* | 11/2023 | Morris | F01D 25/28 |

OTHER PUBLICATIONS

PCT International Search Report and Written Opinion, PCT Application No. PCT/US2025/042306, Aug. 16, 2025, 14 pages.

* cited by examiner

*Primary Examiner* — Viet P Nguyen
(74) *Attorney, Agent, or Firm* — Fenwick & West LLP

(57) ABSTRACT

A power generation transport includes a gas turbine. A turbine enclosure housing the turbine includes: a first intake on a first lateral side of the transport. The first intake is configured to couple to a first ventilation air plenum that provides filtered ventilation air from a first ventilation air module mounted on an air handling transport. The turbine enclosure also includes a second intake on second lateral side of the power generation transport opposite the first lateral side. The second intake is configured to couple to a second ventilation air plenum that provides filtered ventilation air from a second ventilation air module mounted on an auxiliary transport. The power generation transport may also include an inlet plenum with an opening on the first lateral side of the power generation transport, where the inlet plenum is configured to direct filtered combustion air to an intake of the gas turbine.

20 Claims, 20 Drawing Sheets

Power Generation System 100

Power Generation System 400

Power Generation System 500

MOBILE ELECTRIC POWER GENERATION WITH LATERAL SIDE COMBUSTION AIR SUPPLY

TECHNICAL FIELD

The present disclosure relates generally to power generation systems. More particularly, it pertains to modular and mobile gas turbine-based power generation systems that can be rapidly deployed to deliver high-capacity electric power with reduced site infrastructure requirements.

BACKGROUND

Electric power generation using gas turbines plays a critical role in addressing temporary, remote, or emergency power needs. Applications may include disaster recovery, military deployments, grid support during peak demand, or off-grid power generation for different applications. Traditional gas turbine installations typically require extensive site preparation, civil infrastructure, and permanent foundations to support equipment such as air intake systems, turbine and generator enclosures, cooling systems, exhaust stacks, and emissions treatment components. These requirements significantly increase deployment time, cost, and logistical complexity.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1A:
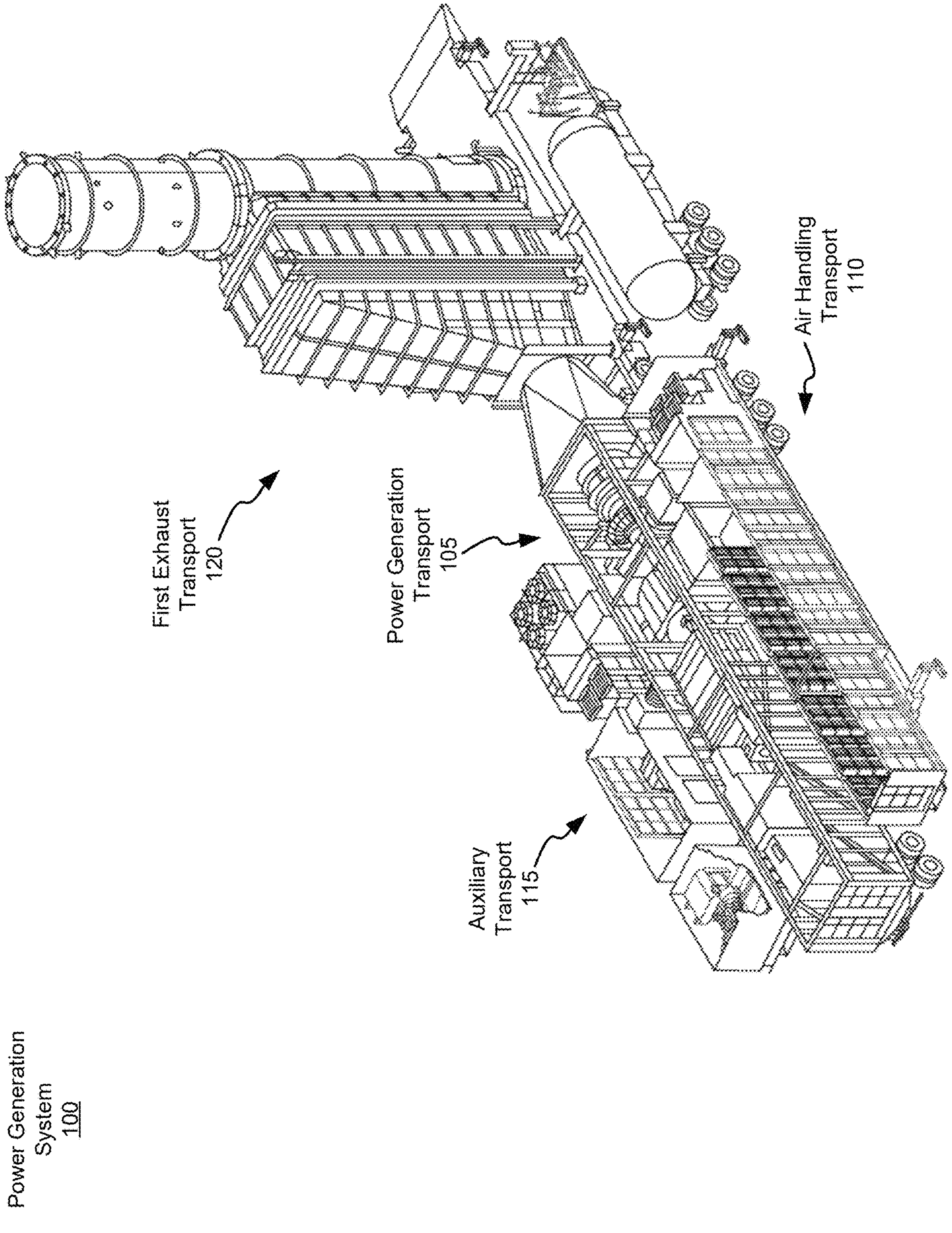
FIGS. 1A-1J are schematic diagrams of a power generation system, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In the following description, for purposes of explanation, numerous specific details are set forth to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all the alternatives, unless the alternatives are explicitly indicated as mutually exclusive. The phrase "at least one of" when combined with a list of items, means a single item from the list or any combination of items in the list. The phrase does not require all the listed items unless explicitly so defined. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "transport" refers to any transportation assembly, including, but not limited to, a trailer, truck, skid, and/or barge used to transport heavy structures, such as a gas turbine, a generator, a power generation system, an air handling system, and the like.

As used herein, the term "trailer" refers to a transportation assembly used to transport heavy structures, such as a gas turbine, a generator, a power generation system, an air handling system, and the like, that can be attached and/or detached from a transportation vehicle used to pull or move the trailer. In one embodiment, the trailer may include the mounts and manifold systems to connect the trailer to other equipment.

Configuration Overview

This disclosure relates to systems and methods for generating mobile electric power using a modular, transport-based architecture. In some embodiments, a mobile power generation system is provided that includes four separately transportable units that can be positioned and interconnected in the field to supply electric power. A first transport (referred to as a power generation transport) may include a turbine and a generator housed in separate enclosures. A second transport (referred to as an air handling transport) may include a combustion air module configured to deliver filtered combustion air and a ventilation module configured to deliver filtered cooling air to the turbine enclosure. A third transport (referred to as an auxiliary transport) may include a generator ventilation module adapted to supply filtered cooling air to the generator enclosure and a second ventilation module also configured to deliver filtered cooling air to the turbine enclosure. A fourth transport (referred to as an exhaust transport) may include an exhaust handling system for receiving exhaust discharged from the turbine and, optionally, from enclosure ventilation systems or a variable bleed valve (VBV).

Each transport may be positioned using conventional towing equipment and aligned precisely using hydraulic walking legs. Airflow and exhaust interfaces between transports may be fluidly connected using expansion joints or expansion connections to accommodate misalignment, vibration, and thermal dynamics while maintaining sealed, continuous flow paths. In some embodiments, the exhaust handling system may include an exhaust stack mounted to a fourth transport. In other embodiments, the system may include a mobile selective catalytic reduction (SCR) system mounted on a laydown trailer, where vertically positioned membranes and an exhaust stack provide exhaust after-treatment functionality.

The transports may be arranged such that the air handling transport, the exhaust transport, and the auxiliary transport are parallel to the power generation transport. This modular architecture supports infrastructure-light deployment of a high-capacity mobile electric power system for use in remote or temporary locations.

INTRODUCTION

A mobile source of electricity (e.g., a mobile electric power generation system, and the like) may be configured to provide mobile electric power for different applications or use cases. The mobile source of electricity may be implemented using a plurality of transports (e.g., three, four, or more transports). The plurality of transports of the mobile source of electricity may include a power generation transport, an air handling transport, an auxiliary transport, an exhaust transport, or some combination thereof.

The transports are separately and independently movable in a transportation mode. During an operation mode, the transports are connectable to each other e.g., without requiring any external mechanical equipment to interconnect the transports. The mobile electric power generation system may be configured to be 'self-sufficient' such that it can be quickly mobilized and de-mobilized without requiring use of external mechanical equipment or apparatus. For example, the mobile source of electricity may improve mobility by enabling a mobilization and de-mobilization time period of, for example, less than 24 hours, less than 36 hours, or less than 48 hours. The mobile source of electricity may also incorporate a three, four, or more transport footprint, where the same transports may be used for the transportation mode and the operation mode without using (e.g., requiring) any external mechanical equipment for mobilization and/or demobilization. After reaching a (e.g., remote) site where a mobile source of electricity will be used (e.g., is required), the transports can be quickly converted from the transportation mode to the operation mode by, e.g., positioning and interconnecting the transports, supplying hydrocarbon fuel to the gas turbine, and further making the required electrical interconnects. The gas turbine and the generator of the power generation transport may then be operated to generate electricity. After the mobile source of electricity is no longer used (e.g., required) at the remote site, the mobile electric power generation system can be quickly mobilized to the transportation mode e.g., without use of any external mechanical equipment. In the operation mode, the power generation system may produce electric power in the range of about 5-80 megawatts (MW).

The mobile source of electricity may have different applications where mobile electric power is needed and where the requisite hydrocarbon fuel (e.g., natural gas, oil, etc.) required to power the gas turbine is available. As a specific non-limiting example, the system may power electric hydraulic fracturing operations for one or more well sites by providing electric power to a variety of fracturing equipment located at the well sites. The different fracturing equipment, which includes, but is not limited to, a blender, hydration unit, fracturing pump transport(s), sand handling equipment, chemical additive system, and the mobile source of electricity, may be configured to operate remotely via a control network system that monitors and controls the fracturing equipment using a communication network.

Figure 1B:
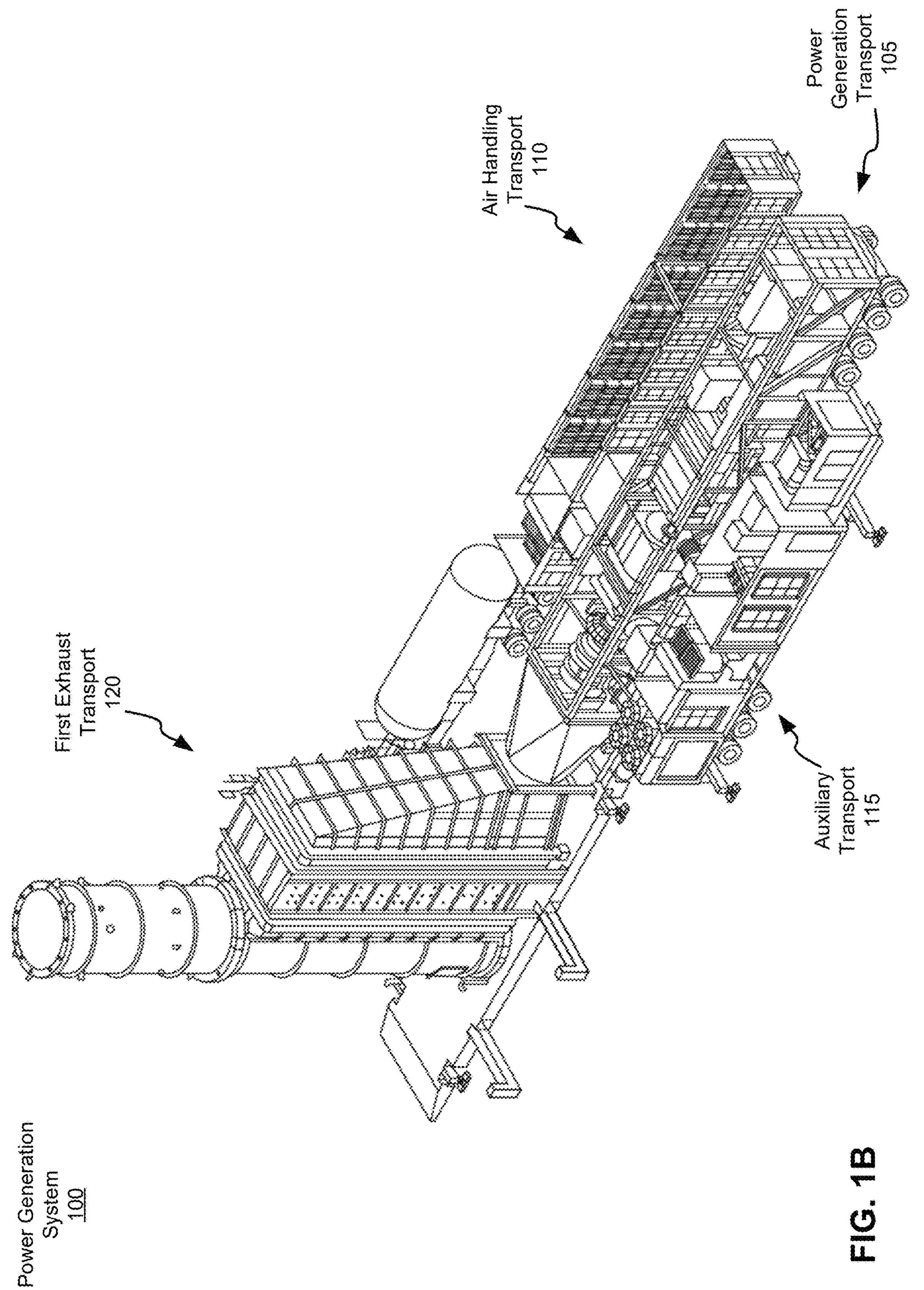
Figure 1C:
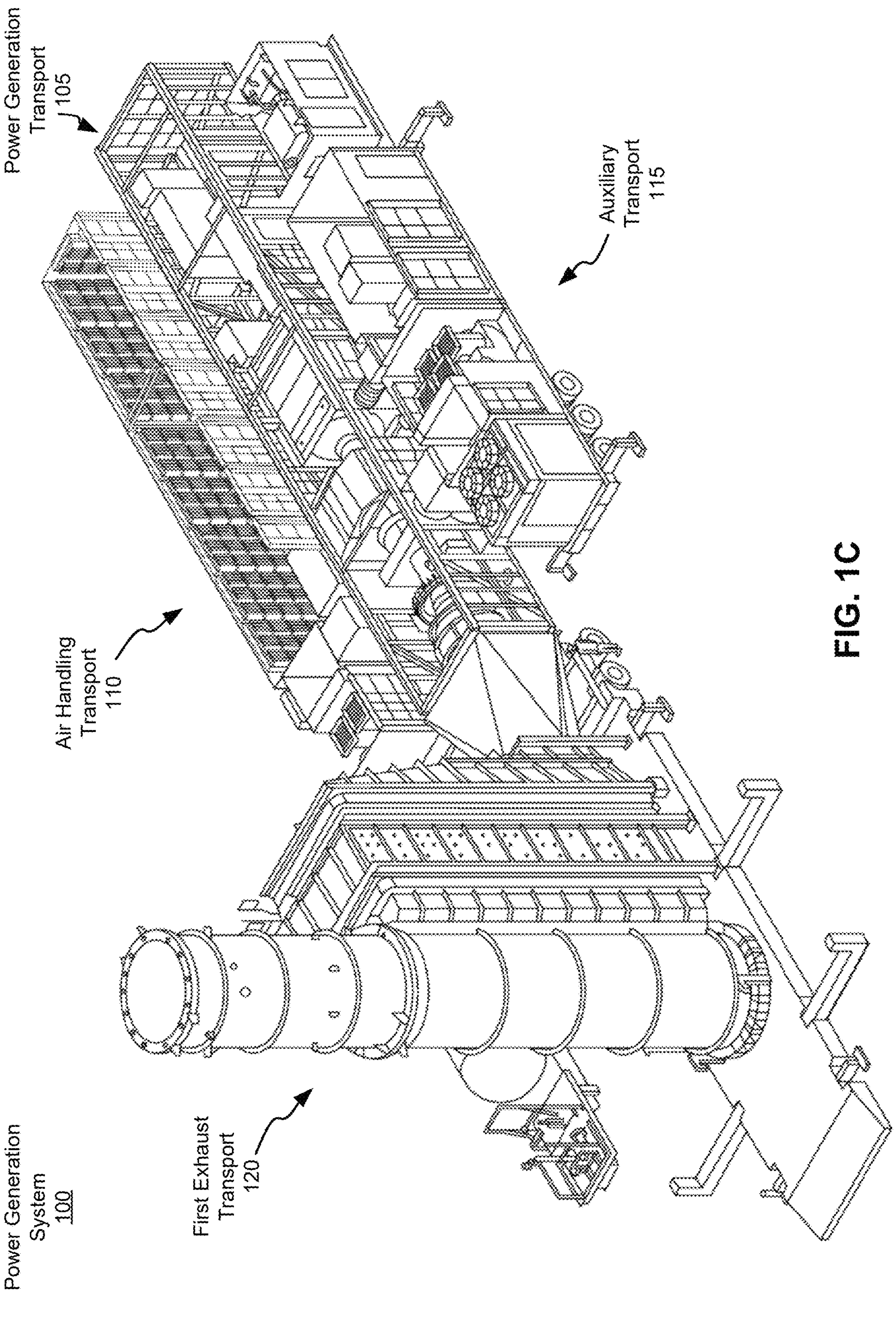
Figure 1D:
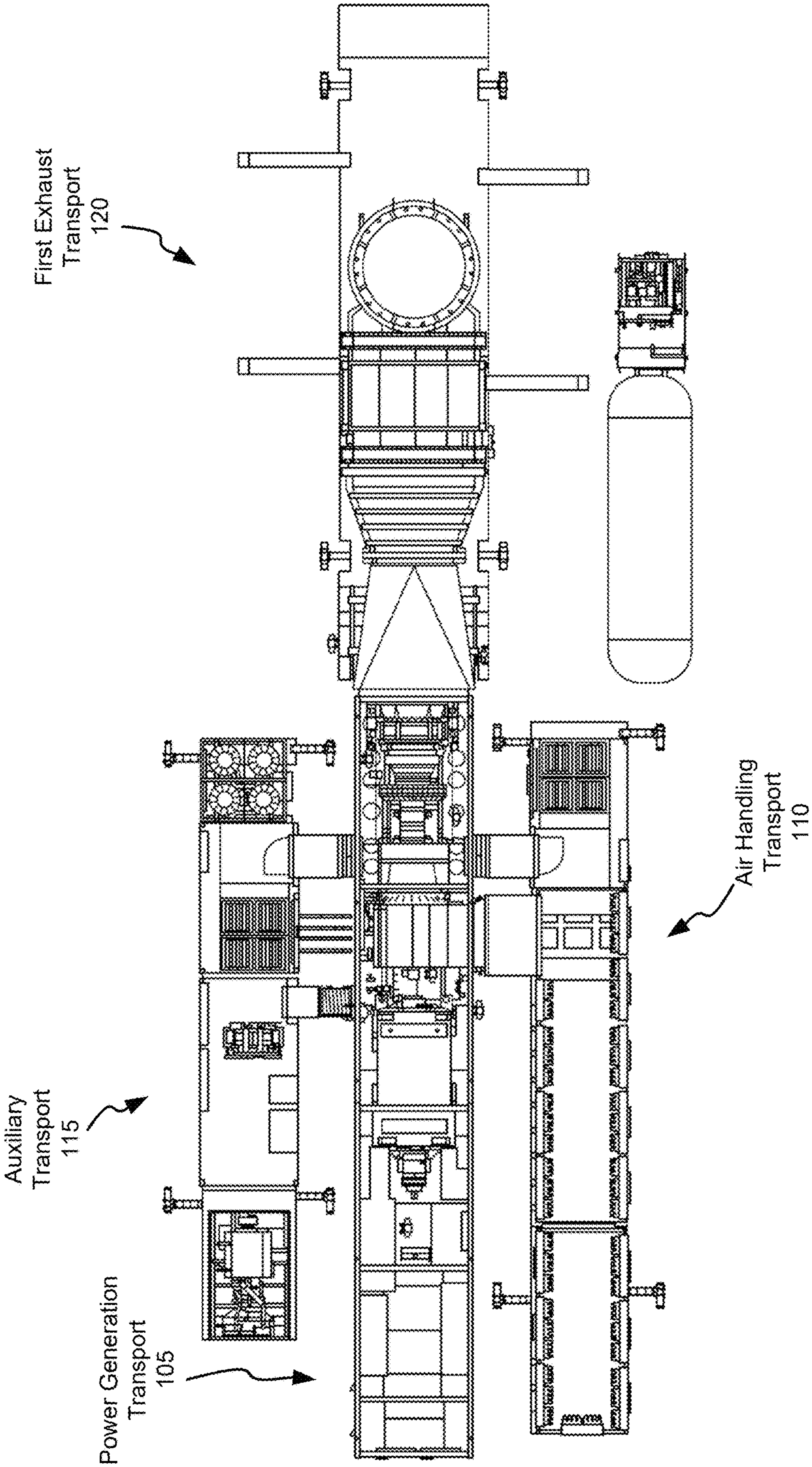
Figure 1E:
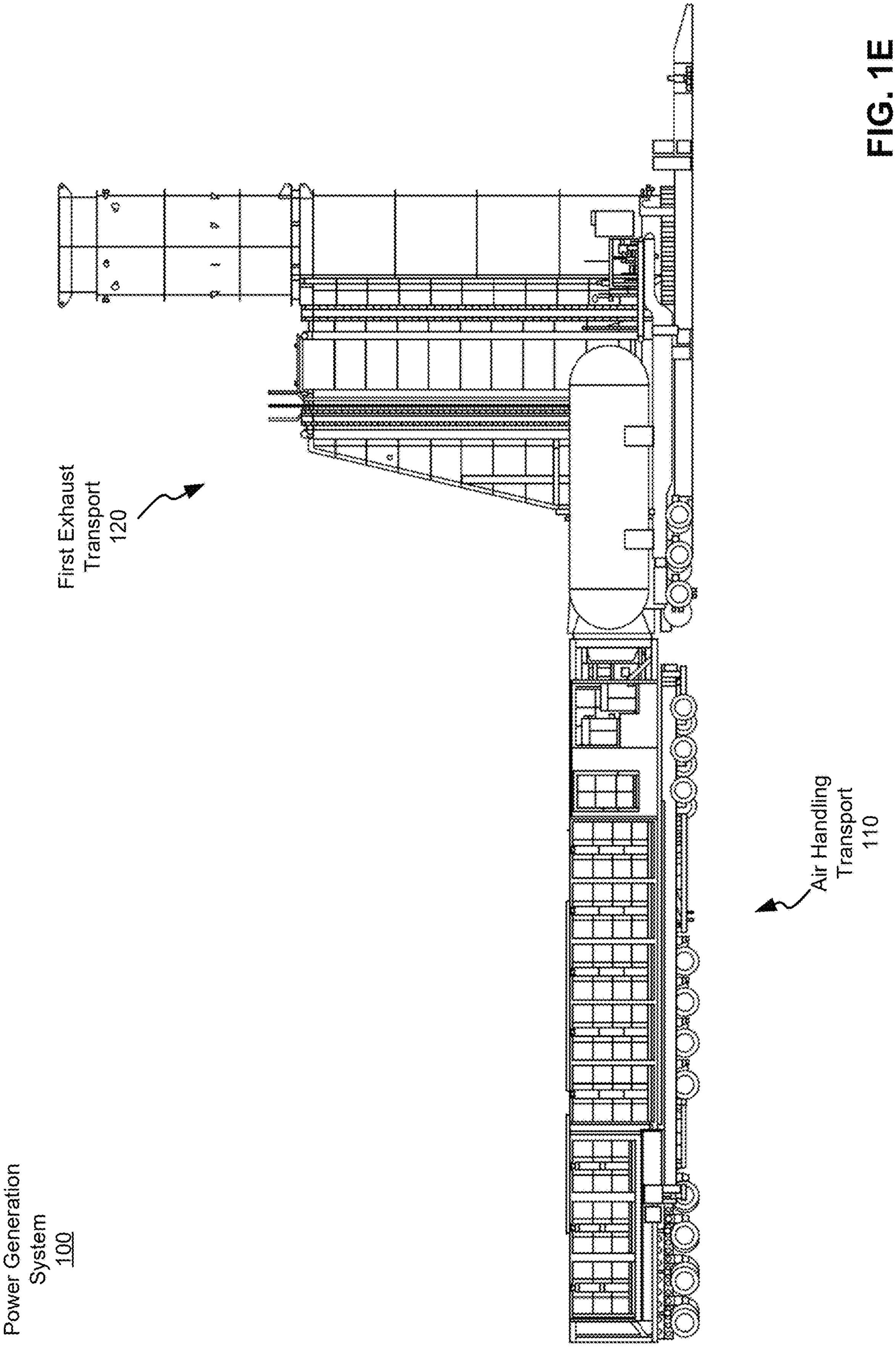
Figure 1F:
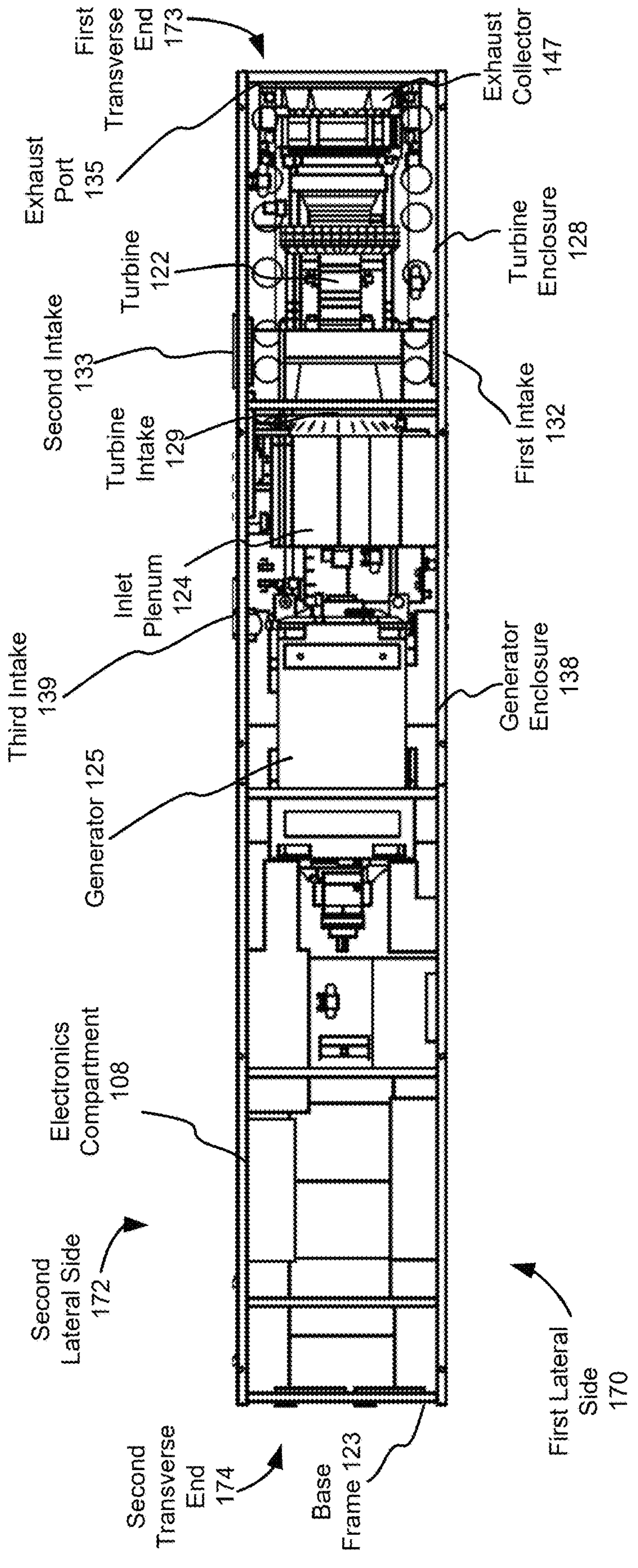
Figure 1G:
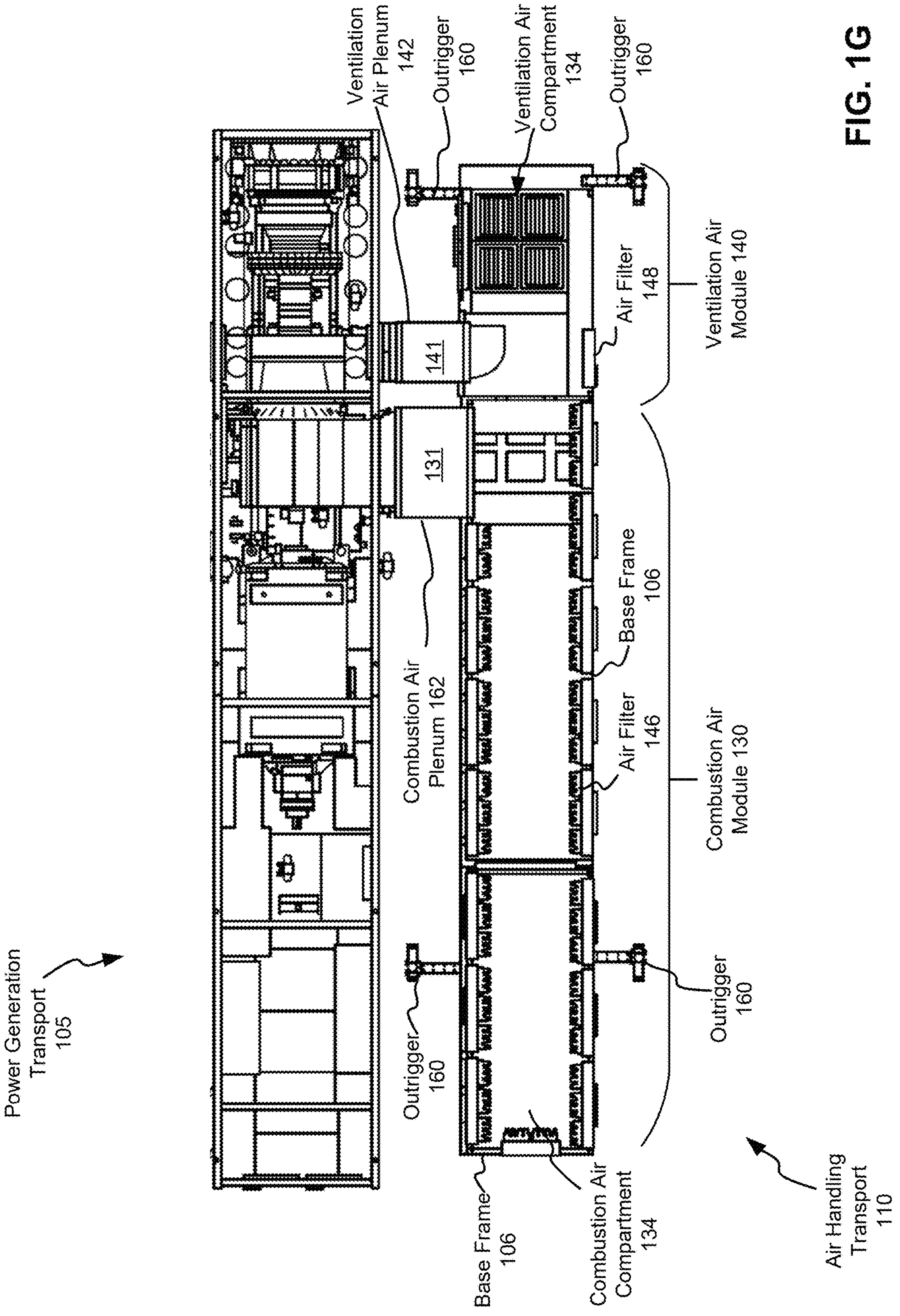
Figure 1H:
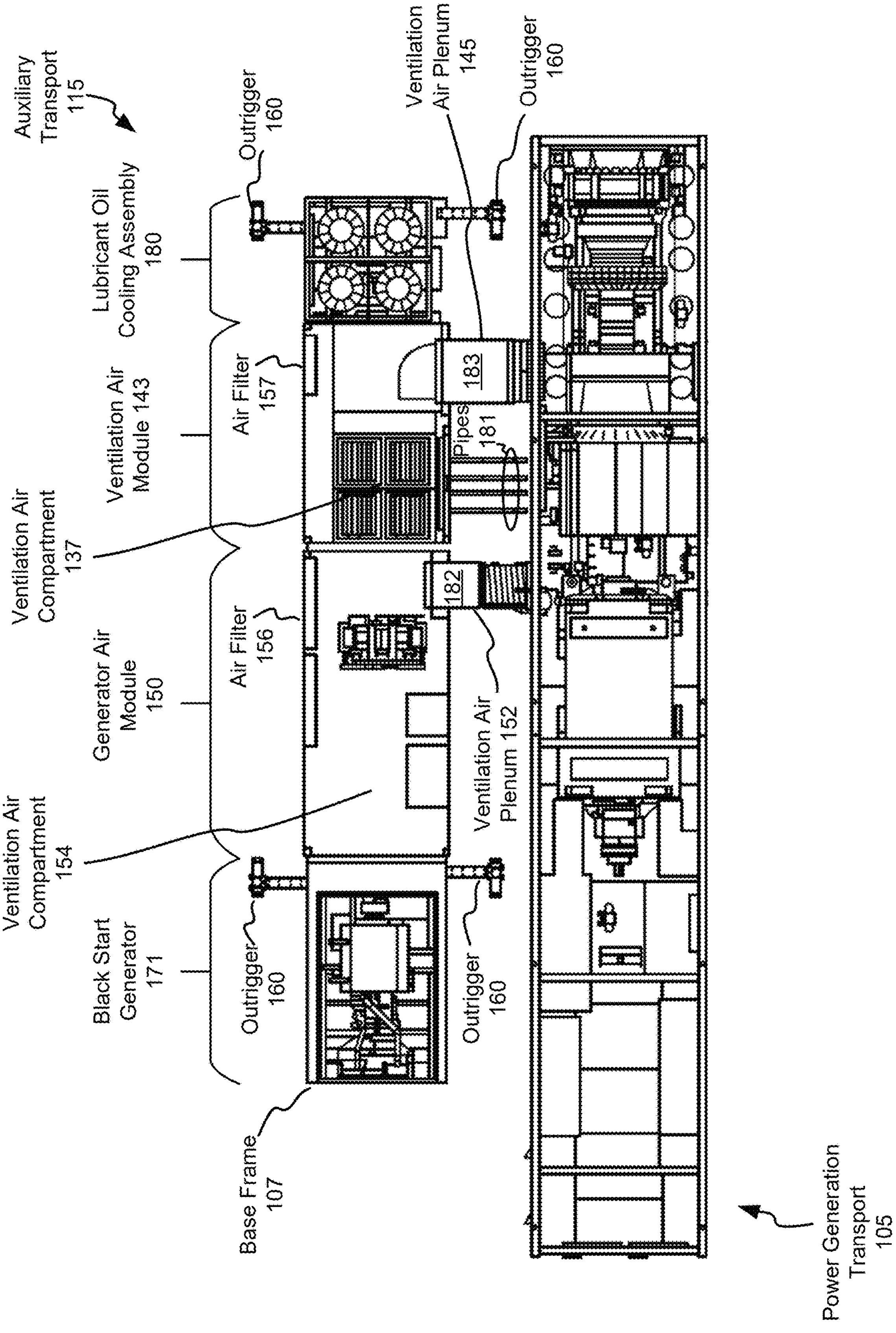
Figure 1I:
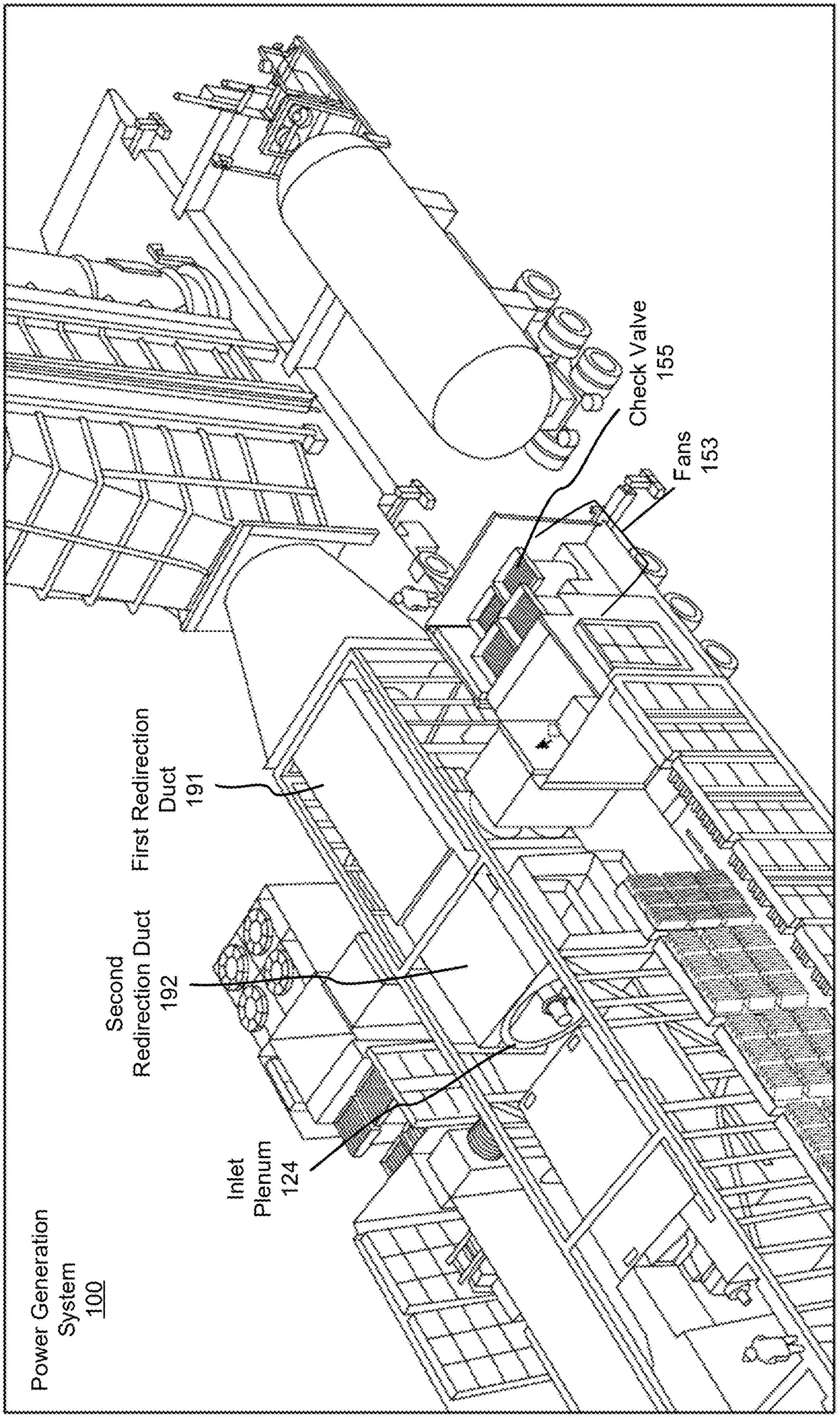
Figure 1J:
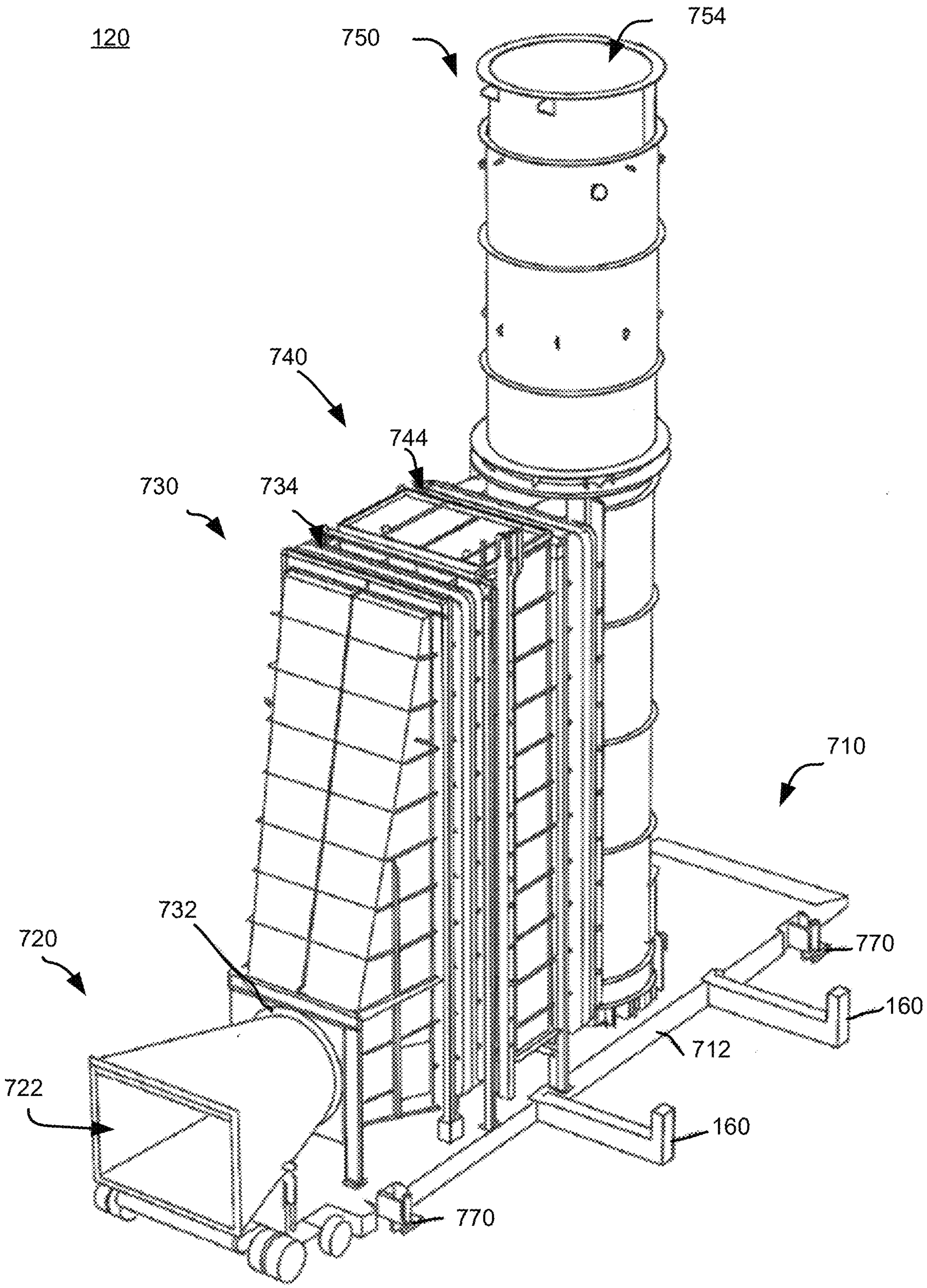

Mobile sources of electricity may also be referred to as power generation systems. An example power generation system 100 is illustrated in FIGS. 1A-1J ("FIG. 1" collectively). The power generation system 100 may be referred to as a "four-transport system" since the illustrated components are part of four separate transports which are aligned with each other. The power generation system 100 includes a power generation transport 105, an air handling transport 110, an auxiliary transport 115, and a first exhaust transport 120. FIGS. 1A-1C are perspective view diagrams of power generation system 100, FIG. 1D is a top view diagram of power generation system 100, FIG. 1E is a side view diagram of power generation system 100, FIG. 1F is a top view diagram of the power generation transport 105, FIG. 1G is a top view diagram of the air handling transport 110, FIG. 1H is a top view diagram of the auxiliary transport 115, FIG. 1I is a perspective diagram of power generation system 100 with a variable bleed valve air circulation system (which is omitted from FIGS. 1A-1H for simplicity), and FIG. 1J is a perspective diagram of the first exhaust transport 120. Note that some components of the transports are partially or fulling hidden for simplicity.

For simplicity, many reference labels are intentionally omitted from various figures. For example, many reference labels are omitted from FIGS. 1A-1E compared to FIGS. 1F-1J. Although FIGS. 1A-1E include fewer reference labels, they still include the components labeled in other figures (e.g., the power generation transport 105 in FIG. 1A, includes the gas turbine 122 and generator 125 labeled in FIG. 1F).

Example Power Generation Transports

The power generation transport 105 of FIG. 1 will now be described. Note that the ceiling and lateral walls of the power generation transport 105 are omitted in FIG. 1 to better illustrate components of the power generation transport 105.

As shown in the example of FIG. 1, the power generation transport 105 includes gas turbine 122 and generator 125. In some other embodiments, gas turbine 122 may be replaced with another type of power source (e.g., a reciprocating engine). The gas turbine 122 may generate mechanical energy (e.g., rotation of a shaft) from a hydrocarbon fuel source, such as natural gas, liquefied natural gas, condensate, and/or other liquid fuels. For example, a shaft of the gas turbine 122 may be connected to the gearbox and the generator 125 such that the generator converts the supplied mechanical energy from the rotation of the shaft of the gas turbine 122 to produce electric power. The gas turbine 122 may be a commercially available gas turbine 122 such as the Baker Hughes NovaLT™ family of gas turbines, the General Electric LM6000 gas turbine, the General Electric LM9000 gas turbine, the General Electric LM2500 family of gas turbines, the Pratt and Whitney FT8 gas turbine, the Solar Titan, Mars, Taurus, Mercury, or Saturn families of gas turbines, Siemens family of turbines, or any other similar gas turbine that can generate the necessary amount of mechanical power for the generator. The generator 125 may be a commercially available generator such as a Brush generator, a WEG generator, or other similar generator configured to generate a compatible amount of electric power. For example, the combination of the gas turbine, the gearbox, and the generator 125 within the power generation system 100 may generate electric power from a range of at least about 1 megawatt (MW) to about 80 MW (e.g., 16 MW, 35 MW, or 38 MW). Other types of gas turbine/generator combinations with power ranges greater than about 80 MW or less than about 1 MW may also be used depending on the application requirement.

Power generation transport 105 includes a first lateral side 170, a second lateral side 172 opposite the first lateral side 170, and transverse ends between the lateral sides, more specifically a first transverse end 173 and a second transverse end 174. As used herein, the lateral sides of a transport may refer to the longer sides and the transverse sides of a transport may refer to the shorter sides. Additionally, or alternatively, the plane of a lateral side is substantially parallel to the direction of travel of the transport during a transportation mode and the plane of a transverse side is substantially perpendicular to the direction of travel of the transport during a transportation mode. In the example of FIG. 1, the first lateral side 170 faces the air handling transport 110, the second lateral side 172 faces the auxiliary transport 115, and the first transverse end 173 faces the first exhaust transport 120.

An inlet plenum 124 is coupled to a turbine intake 129 of the gas turbine 122 and configured to intake filtered combustion air from a combustion air plenum 162 of the air handling transport 110 and supply the filtered combustion air to the turbine intake 129 of the gas turbine 122. The gas turbine 122 generates mechanical energy (e.g., rotation of a shaft) from a hydrocarbon fuel source, such as natural gas, liquefied natural gas, condensate, and/or other liquid fuels. The gas turbine 122 has a shaft that is connected to the generator 125 such that the generator converts the supplied mechanical energy from the rotation of the shaft to produce electric power. In the example of FIG. 1, the shaft extends from the turbine intake 129 to connect to generator 125. This may be referred to as a "cold end" configuration.

Gas turbine 122 includes an exhaust collector 147 that receives exhaust gas from gas turbine 122. Exhaust collector 147 is positioned near or at the first transverse end 173 of power generation transport 105. Exhaust collector 147 is configured to collect exhaust air discharged from the gas turbine 122 and supply the exhaust air to an exhaust inlet of the first exhaust transport 120 (e.g., exhaust inlet 722 in FIG. 1J or exhaust inlet 240 in FIGS. 2A-2C).

In one or more embodiments, the gas turbine 122, the generator 125, and other components of the power generation transport 105 may be mounted to a base frame 123, a sub-base, sub-skid, or any other sub-structure used to support the mounting of the components. The base frame 123 may allow for easier alignment and connection of the gas turbine 122 and the generator 125 compared to using separate sub-base for the gas turbine 122 and the generator 125. Other embodiments of the power generation transport 105 may use a plurality of sub-bases by, for example, mounting the gas turbine 122 on one sub-base and mounting the generator 125 on another sub-base.

The gas turbine 122 is housed in a turbine enclosure 128. Filtered ventilation air is input into the turbine enclosure 128 to help with cooling and ventilation of the gas turbine 122 during operation. In the example of FIG. 1, this filtered air enters through the first intake 132 at the first lateral side 170 and the second intake 133 at the second lateral side 172. As further described below, filtered air may be provided by ventilation air module 140 of air handling transport 110 via a ventilation air plenum 142 coupled to first intake 132. Additionally, or alternatively, filtered air may be provided by ventilation air module 143 on auxiliary transport 115 via ventilation air plenum 145 coupled to second intake 133. The filtered ventilation air exits turbine enclosure 128 through exhaust port 135, and exhaust port 135 directs the exhaust ventilation air to an exhaust inlet 722 of first exhaust transport 120.

The generator 125 is housed in a generator enclosure 138. Filtered ventilation air is input into the generator enclosure 138 to help with cooling and ventilation of generator 125 during operation. In the example of FIG. 1, this filtered air enters through third intake 139. As further described below, filtered air may be provided by generator air module 150 of auxiliary transport 115 via ventilation air plenum 152 coupled to third intake 139.

Filtered ventilation air may exit generator enclosure 138 by one or more components. In a first example, exhaust ventilation air is directed to exhaust inlet 722 of first exhaust transport 120 via one or more ducts or plenums that run parallel to the gas turbine 122 (e.g., a duct or plenum similar to first redirection duct 191 that extends to generator enclosure 138 and receives exhaust ventilation air instead of bleed valve air). In some embodiments, exhaust ventilation air is directed to inlet 722 by being injected into a variable bleed valve air circulation system (e.g., as described with respect to FIG. 1F). For example, a duct or plenum is coupled to generator enclosure 138 and first redirection duct 191, allowing air to flow from the generator enclosure 138, through first redirection duct 191, and into inlet 722. In a second example for exhausting ventilation air from generator enclosure 138, the ventilation air is directed to a vertical exhaust stack (e.g., via an exhaust port on generator enclosure 138) mounted on top of power generation transport 105 (e.g., above generator enclosure 138). The stack may extend vertically while in an operational mode and release the ventilation air into the external environment. In a third example, generator enclosure 138 includes an exhaust port at a side of power generation transport 105, such as first lateral side 170 or second lateral side 172, that couples to a plenum of a generator exhaust system (e.g., on air handling transport 110 or auxiliary transport 115). For example, see FIGS. 3A-3B that includes a generator exhaust module 375 with a plenum 348 that couples to an exhaust port 347 on the second lateral side 372 of power generation transport 305.

Power generation transport 105 may include an electronics compartment 108 that houses one or more electronic components of power generation system 100. For example, the electronics compartment 108 includes a battery cabinet with one or more batteries, a UPC controls cabinet, an MCC cabinet with one or more MCCs, or any combination thereof. The one or more batteries in the battery cabinet may provide an alternate source of power and may be utilized to store electric power generated by, e.g., a transformer. In some embodiments, generator enclosure 138 includes an exhaust vent (e.g., facing second transverse end 174) that enables ventilation air to flow into electronics compartment

108 to help cool and ventilate the electronics compartment 108. In the example of FIG. 1, the electronics compartment 108 is between generator enclosure 138 and second transverse end 174.

To improve mobility over a variety of roadways, the power generation transport 105 may have a maximum height of about 13 feet and 6 inches, a maximum width of about 119 inches, and a maximum length of about 80 feet. Further, the power generation transport 105 may comprise at least three axles used to support and distribute the weight on the power generation transport 105. Other embodiments of the power generation transport 105 may include transports that exceed three axles depending on the total transport weight. The dimensions and the number of axles may be adjusted to allow for the transport 105 to be able to navigate over roadways that typically mandate certain height, length, and weight restrictions.

Example Air Handling Transports

The example air handling transport 110 of FIG. 1 includes a base frame 106, a combustion air module 130, and a ventilation air module 140. The combustion air module 130 is mounted to the base frame 106 and includes a combustion air plenum 162 and a combustion air compartment 134 including many air filters (e.g., air filter 146) for providing filtered combustion air to the combustion air plenum 162, the filtered combustion air being output from combustion air plenum 162 to the inlet plenum 124 of the gas turbine 122 of the power generation transport 105. More specifically, air flows from the external environment, through the filters (e.g., air filter 146) into ventilation air compartment 134. Air in ventilation air compartment 134 then flows through combustion air plenum 162 into inlet plenum 124. Note that the ceiling of combustion air module 130 is omitted FIG. 1 so that ventilation air compartment 134 can be seen.

The ventilation air module 140 is mounted to the base frame 106 and includes a ventilation air plenum 142 and a ventilation air compartment 134 including many air filters (e.g., air filter 148) for providing filtered ventilation air that is output from the ventilation air plenum 142 to the turbine enclosure 128. More specifically, air flows from the external environment, through the filters (e.g., air filter 148) into ventilation air compartment 134. Air in ventilation air compartment 134 then flows through ventilation air plenum 142 into turbine enclosure 128. Ventilation air compartment 134 includes a set of fans 153 (four in the example of FIG. 1) that drive the flow of ventilation air. In the example of FIG. 1, each fan includes a check valve (e.g., check valve 155) that reduces or prevents ventilation air from backflowing. Among other advantages, the check valves enable the operation of ventilation air module 140 without all fans operating. For example, if one of the fans 153 malfunctions or is shut off, the check valve reduces or prevents air from backflowing through that fan. Note that FIG. 1 omits a lateral side wall and the ceiling of ventilation air module 140 so that ventilation air compartment 134 (including fans 153) can be seen.

In the example of FIG. 1, the combustion air module 130 and the ventilation air module 140 are arranged such that the ventilation air module 140 is closer to first transverse end 173 and combustion air module 130 is closer to second transverse end 174.

As shown, the air handling transport 110 may be equipped with outriggers 160 that are operable using one or more of hydraulics, pneumatics, electric motors, and/or mechanical components. For example, each of the outriggers 160 may include a first hydraulic cylinder that lifts the air handling transport 110 up and a second hydraulic cylinder that moves the transport in the designated orientation or direction. The outriggers 160 may be actuated in the operation mode for lifting and positioning the air handling transport 110 and enabling side-to-side movement and fore-aft movement of the air handling transport 110. That is, the outriggers 160 may enable the air handling transport 110 to move in a direction toward the power generation transport 105 when the power generation transport 105 and the air handling transport 110 are parked next to each other during the transition to the operation mode. Conversely, when transitioning from the operation mode to the transportation mode, the outriggers 160 may enable the air handling transport 110 to move in a direction away from the power generation transport.

In one or more embodiments, to more finely adjust the positioning, alignment, and distance to connect the two transports (i.e., 105 and 110), the air handling transport 110 may further include expansion connections 131, 141 (e.g., powered slide outs). The expansion connections 131, 141 may respectively move and align the combustion air plenum 162 and the ventilation air plenum 142 into position for mating with the corresponding plenums or ports of the power generation transport 105 (on the first lateral side 170) without attaching the two transports to transportation vehicles (e.g., via a tractor or other type of motor vehicle). Expansion connections may be used to help connect other transports as well, such as the power generation transport 105 and the auxiliary transport 115.

The combustion air plenum 162 duct and the ventilation air plenum 142 duct may be retracted and stored within the air handling transport 110 during the transportation mode. While transitioning to the operation mode, the expansion connection 131 may cause the combustion air plenum 162 duct to slide outward to be in a position where it can mate with the inlet plenum 124 of the gas turbine 122. Similarly, while transitioning to the operation mode, the expansion connection 141 may cause the ventilation air plenum 142 duct to slide outward to be in a position where it can mate with the first intake 132 port of the turbine enclosure 128 on the power generation transport 105. The expansion connections 131, 141 may be operable using one or more of hydraulics, pneumatics, electric motors, and/or mechanical components. Similarly, plenums of the auxiliary transport 115 (e.g., 145 and 152) may be retracted and stored during a transportation mode for the auxiliary transport 115.

Among other advantages, the outriggers 160 and the expansion connections 131, 141 on the air handling transport 110 increase mobility of the air handling transport 110 by reducing the precision needed when parking the two transports next to each other during operation.

Example Auxiliary Transports

In the example of FIG. 1, auxiliary transport 115 includes a base frame 107, a black start generator 171, a generator air module 150, a ventilation air module 143, and a lubricant oil cooling assembly 180.

Generator air module 150 is mounted to the base frame 107 and includes a ventilation air plenum 152 and a ventilation air compartment 154 including many air filters (e.g., air filter 156) for providing filtered ventilation air to the ventilation air plenum 152, the filtered ventilation air being output from ventilation air plenum 152 to the generator enclosure 138. More specifically, air flows from the external environment, through the filters (e.g., air filter 156) into ventilation air compartment 154. Air in ventilation air compartment 154 then flows through ventilation air plenum 152 into generator enclosure 138. Note that the ceiling of generator air module 150 is omitted in FIG. 1 so that ventilation air compartment 154 can be seen.

In some embodiments, ventilation air compartment 154 houses one or more electronic components of power generation system 100. For example, ventilation air compartment 154 includes an automatic transfer switch (ATS), one or more MCCs, a transformer, an electrical turbine control enclosure, or any combination thereof. The transformer may be configured to receive power at a higher voltage (e.g., 13.8 kV) and step down the voltage (e.g., to 480V) so that it can be utilized for various applications requiring the low voltage. The transformer may be operated via the ATS, that may take in power at a higher voltage (e.g., 13.8 kV), and switch and reduce it to a lower voltage (e.g., 480V) through the transformer for turbine control power. Among other advantages, storing electronic components in ventilation air compartment 154 (as opposed to storing all electronic components in electronics compartment 108 of power generation transport 105) may reduce the total weight of the power generation transport 105. This may help power generation transport 105 stay below a threshold total weight (e.g., so that power generation transport 105 can be transported over public roads when in a transportation mode). Furthermore, electrical components in the ventilation air compartment 154 may be ventilated and cooled as air flow through the ventilation air compartment 154 and into the ventilation air plenum 152.

Ventilation air module 143 on auxiliary transport 115 may have similar components as ventilation air module 140 on air handling transport 110. Ventilation air module 143 is mounted to base frame 107 and includes a ventilation air plenum 145 and a ventilation air compartment 137 including many air filters (e.g., air filter 157) for providing filtered ventilation air that is output from the ventilation air plenum 145 to the turbine enclosure 128. More specifically, air flows from the external environment, through the filters (e.g., air filter 157) into ventilation air compartment 137. Air in ventilation air compartment 137 then flows through ventilation air plenum 145 into turbine enclosure 128. Ventilation air module 143 may include a set of fans with check valves to drive the flow of ventilation air, similar to fans 153 of ventilation air module 140. Note that a lateral side wall and the ceiling of ventilation air module 143 are omitted in FIG. 1 so that ventilation air compartment 137 (including the fans) can be seen.

Auxiliary transport 115 may also include a black start generator 171 mounted to base frame 107. The black start generator 171 may be configured to provide power to start operation of the power generation system 100. For example, the black start generator 171 may provide power to the gas turbine 122 to initialize operation of the gas turbine. Note that a portion of a side wall and the ceiling of the black start generator 171 are omitted in FIG. 1 so that components of the black start generator can be seen.

Lubricant oil cooling assembly 180 is mounted to base frame 107. Lubricant oil cooling assembly 180 includes a compartment with a set of one or more lubricant oil radiators and a set of one or more fans. A lubricant oil radiator may be a radiator (e.g., one or more heat exchanger coils) for cooling gas turbine lubricant oil and/or generator lubricant oil that is stored in lubricant oil tanks (not shown). Ambient air driven by the set of fans may flow from the external environment through the lubricant oil radiators while hot lubricant oil is circulated in finned metal tubes of the lubricant oil radiators to cool the lubricant oil. The ambient air may collect the radiant heat from the finned metal tubes of the lubricant oil radiators and the heated air may flow out from one or more exhaust ports on the top side the compartment. Lubricant oil may flow between (a) the lubricant oil cooling assembly 180 and (b) the gas turbine 122 and/or generator 125 via oil pipes 181 coupled to the second lateral side 172 or underside of power generation transport 105.

In the example of FIG. 1, components of the auxiliary transport 115 are arranged in the following order to align with their corresponding components on the power generation transport 105: lubricant oil cooling assembly 180, ventilation air module 143, generator air module 150, and black start generator 171, where the lubricant oil cooling assembly 180 is closest to the first transverse end 173 and the black start generator 171 is closest to the second transverse end 174. However, other arrangements are possible and one or more of the components may be located on another transport. For example, in FIGS. 3A and 3B, the components of the auxiliary transport 315 are in the following order: ventilation air module 343, generator air module 351, generator exhaust module 375, and black start generator 171, where the ventilation air module 343 is closest to the first transverse end 373 and the black start generator 371 is closest to the second transverse end 372 of the power generation transport 305.

Similar to the air handling transport 110, the auxiliary transport 115 may be equipped with outriggers 160. Separately, to more finely adjust the positioning, alignment, and distance to connect the two transports (i.e., 105 and 115), the auxiliary transport 115 may further include expansion connections 182, 183 (e.g., powered slide outs). The expansion connections 182, 183 may respectively move and align the ventilation air plenum 152 and the ventilation air plenum 145 into position for mating with the corresponding plenums or ports of the power generation transport 105 (on the second lateral side 172) without attaching the two transports to transportation vehicles (e.g., via a tractor or other type of motor vehicle).

The ventilation air plenum 152 duct and the ventilation air plenum 145 duct may be retracted and stored within the auxiliary transport 115 during the transportation mode. While transitioning to the operation mode, the expansion connection 182 may cause the ventilation air plenum 152 duct to slide outward to be in a position where it can mate with the third intake 139. Similarly, while transitioning to the operation mode, the expansion connection 183 may cause the ventilation air plenum 145 duct to slide outward to be in a position where it can mate with the second intake 133 port of the turbine enclosure 128 on the power generation transport 105. The expansion connections 182, 183 may be operable using one or more of hydraulics, pneumatics, electric motors, and/or mechanical components.

Among other advantages, the outriggers 160 and the expansion connections 182, 183 on the auxiliary transport 115 increase mobility of the auxiliary transport 115 by reducing the precision needed when parking the two transports next to each other during operation.

Example First Exhaust Transports

In the example of FIG. 1, the first exhaust transport 120 is a mobile transport with a selective catalytic reduction (SCR) system and thus may be referred to as a mobile SCR system. An SCR system is an emissions control technology configured to reduce nitrogen oxides (NOx) in exhaust gases from combustion engines and turbines. An SCR system may inject a reducing agent, such as ammonia or urea, into the exhaust stream, where it reacts with NOx in the presence of a catalyst to form nitrogen and water, thereby neutralizing harmful pollutants before releasing the exhaust gases into the external environment.

FIG. 1 illustrates the mobile SCR system 120 in an operation mode. In other words, FIG. 1 shows the system 120 after it is (e.g., fully) deployed, with (e.g., all) SCR components erected and mounted on a single laydown trailer 710.

The laydown trailer 710 may be a mobile platform configured to support components of the SCR system 120 during both transportation and operation. In the operation mode illustrated in FIG. 1, the trailer 710 carries and supports an SCR collector 720, a first SCR membrane 730, a second SCR membrane 740, and an exhaust stack 750. The first SCR membrane 730, the second SCR membrane 740, and the exhaust stack 750 may be adapted to be oriented horizontally during transportation, and these components may be oriented vertically during operation. FIG. 1 shows the SCR collector 720, the first SCR membrane 730, the second SCR membrane 740, and the exhaust stack 750 connected in series to each other during operation to form a continuous flow path for the treatment of exhaust gases.

The SCR collector 720 may be positioned at an upstream end of the system 120 and may include an exhaust inlet 722 configured to receive exhaust gases from the power generation transport 105 positioned adjacent to the laydown trailer 710. The SCR collector 720 may include a flanged or flexible coupling for connecting to the exhaust outlet of the prime mover for operation. Although not shown in FIG. 1, the SCR collector 720 may be slidably mounted on the laydown trailer 710 and may serve to direct exhaust gases into the first SCR membrane.

The first SCR membrane 730 may be positioned downstream of the SCR collector 720 and coupled to the collector 720 via air inlet 732. The first SCR membrane 730 may include a catalyst that facilitates a chemical reaction between a reducing agent—such as ammonia or urea—and nitrogen oxides ($NO_x$) present in the exhaust stream, thereby converting them into nitrogen and water vapor. The second SCR membrane 740 may be positioned downstream of the first SCR membrane 730 and fluidly coupled to it via a flange or duct connection (e.g., an expansion joint). The second SCR membrane 740 may provide an additional stage of catalytic reduction to ensure that $NO_x$ levels are reduced to meet or exceed applicable environmental standards.

The exhaust stack 750 may be positioned at a downstream end of the system 120 and coupled to the second SCR membrane 740 via a flange or duct connection (e.g., expansion joint). The exhaust stack 750 may provide a vertical outlet 754 for venting the treated exhaust gases to the atmosphere. The height of the exhaust stack may be selected to satisfy dispersion or regulatory requirements. In some embodiments, the height of the exhaust stack 750 may be approximately 60 feet.

The SCR collector 720, the first SCR membrane 730, the second SCR membrane 740, and the exhaust stack 750 may be mounted in a vertical orientation on the laydown trailer 710 during operation. In some embodiments, one or more of these components may be pivotably or detachably connected to the trailer 710 and raised into position using hydraulic actuators or lifting equipment during setup. Once in the vertical operating position, the components may be structurally secured to the trailer frame.

The laydown trailer 710 may further include a set of hydraulic outriggers 160 (two of which are visible in FIG. 1J). In some embodiments, the set of outriggers 160 may include four outriggers 160—two positioned on each lateral side of the trailer. Each outrigger 160 extends laterally outward from the main chassis 712 (main body) of the trailer 710 and may be configured to deploy vertically downward to engage the ground surface. The outriggers 160 may be actuated by hydraulic cylinders that allow them to be extended and retracted as needed for setup, stabilization, and leveling. During deployment and operation, the outriggers 160 may provide structural stability to the trailer and counteract tipping or shifting forces that may arise due to wind loads, ground irregularities, or the vertical height of the erected SCR components. In some embodiments, the outriggers 160 are retractable and stowable within the trailer 710 frame (e.g., base frame) or chassis for transportation.

In some embodiments, the laydown trailer 710 is also equipped with a set of walking legs 770, two of which are visible in FIG. 1J. The walking legs 770 may be mounted to the underside of the trailer 710 chassis, with two legs positioned on each longitudinal side of the trailer. Each walking leg 770 may include a hydraulic actuator and a footpad or skate at its base and may be configured to incrementally lift and reposition the trailer 710 along the ground in a controlled manner. This "walking" capability enables fine positional adjustment of the trailer 710 in both the longitudinal and vertical directions, which is particularly useful for aligning the SCR collector 720 with the power generation transport 105 (e.g., with exhaust collector 147 and/or exhaust port 135). For example, after the trailer is initially positioned near the power generation transport 105, and the SCR collector 720 is slidably positioned (e.g., along a rail system) to be adjacent to the exhaust collector 147 and/or exhaust port 135, the walking legs 770 can be actuated in a sequenced manner to crawl the trailer forward, backward, up, down, or slightly sideways until the collector inlet is properly aligned. In some embodiments, the set of walking legs 770 may enable 6-DOF (degrees of freedom) movement of the laydown trailer 710 relative to the power generation transport 105. In other embodiments, the set of walking legs 770 may enable 4-DOF movement of the laydown trailer 710 relative to the power generation transport 105. The walking legs 770 may also be used to adjust trailer pitch or height during setup. When not in use, the hydraulic walking legs 770 may be retracted to stow beneath the trailer 710 for transportation. FIG. 1 illustrates the assembled and deployed configuration of the mobile SCR system 120, suitable for use in reducing emissions from the power generation transport 105. The modular and mobile design of the system 120 enables rapid transportation, setup, and teardown, making it ideal for temporary, remote, or rapidly deployable power applications.

As stated above, the mobile SCR system 120 is a mobile system. Traditional SCR systems are typically designed for permanent installation and may use significant civil infrastructure, including cranes or forklifts for assembly and disassembly. This makes them impractical for temporary or mobile power generation applications. Even for permanent power generation applications, traditional SCR systems incur substantial installation costs.

Thus, the system 120 may enable rapid deployment and removal of the SCR system in both stationary and mobile power generation applications e.g., eliminating the need for traditional, infrastructure-intensive SCR installations. Thus, the mobile SCR system may fill a need for a modular, transportable SCR system that can be rapidly deployed and aligned with a combustion source without the need for heavy lifting equipment. The system reduces setup time, lowers installation costs, and expands the applicability of SCR technology to mobile and temporary power generation environments.

In some embodiments, the mobile SCR system 120 includes multiple independently movable transports, including the laydown trailer 710 and one or more transport trailers (not illustrated). The laydown trailer 710 carries the first SCR membrane 730 and the SCR collector 720 that interfaces with an exhaust of the power generation transport 105 (e.g., from the gas turbine 122). The transport trailers may respectively carry the second SCR membrane 740 and the exhaust stack 750, each positioned horizontally during transportation and configured to be raised into a vertical operating position upon arrival at the deployment site.

Example Second Exhaust Transports

Figure 2A:
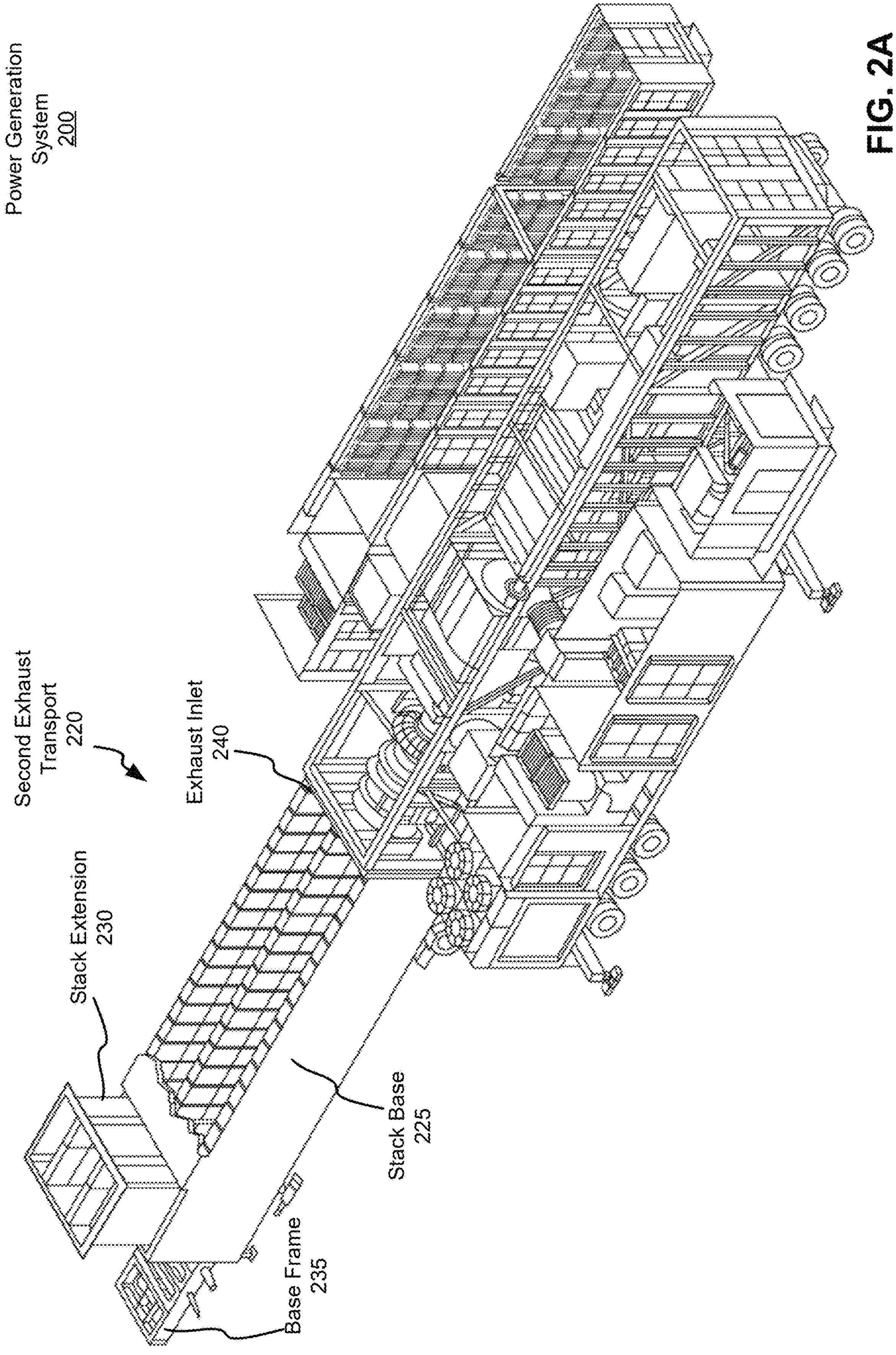
FIGS. 2A-2C are schematic diagrams of another power generation system, according to one or more embodiments.
Figure 2B:
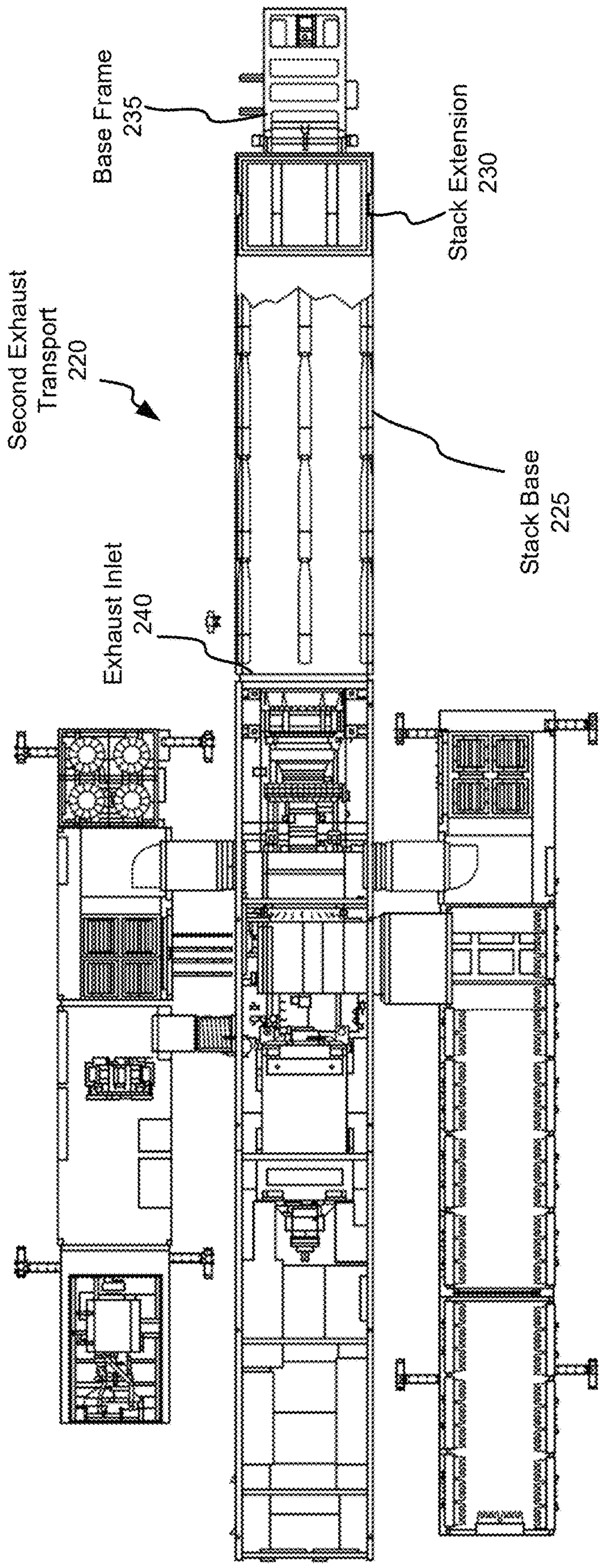
Figure 2C:
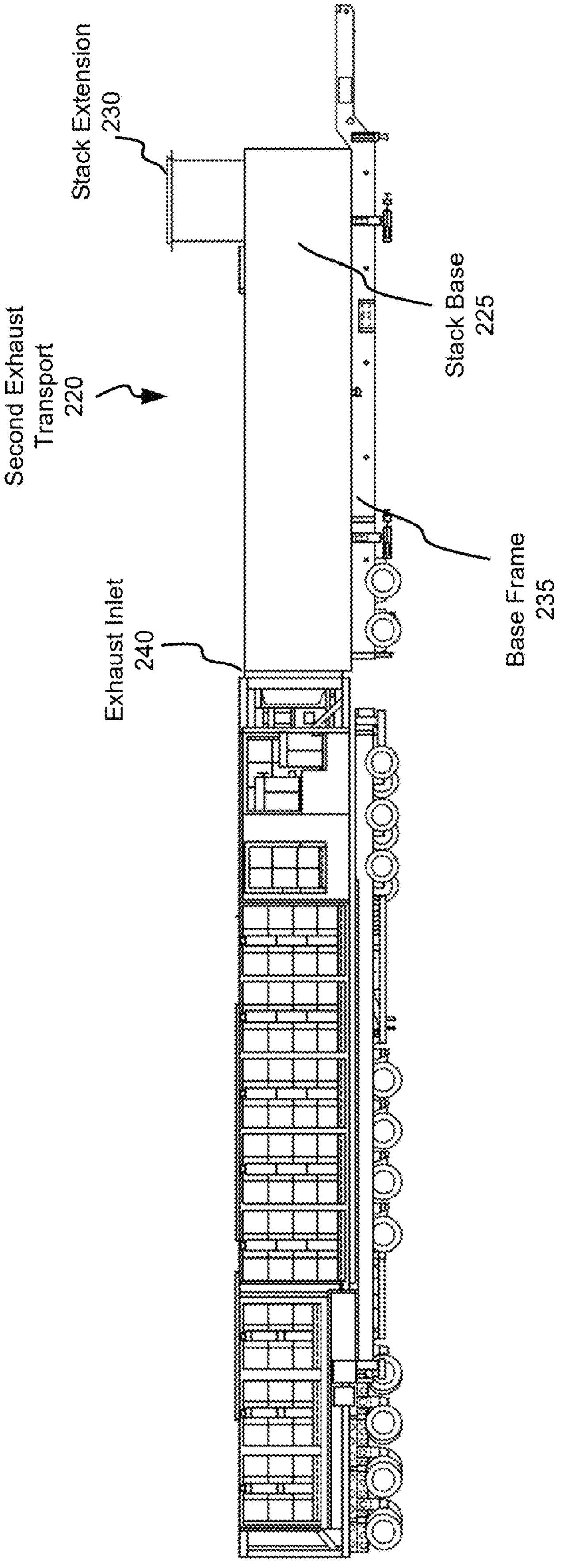

A power generation system may include a different exhaust transport than first exhaust transport 120. FIGS. 2A-2C ("FIG. 2" collectively) illustrate another example power generation system 200 with another example exhaust transport (referred to as second exhaust transport 220), according to one or more embodiments. The power generation system 200 is similar to the power generation system 100 except the first exhaust transport 120 is replaced with the second exhaust transport 220. Thus, labels for the other transports (e.g., 105, 110, and 115) are omitted from FIG. 2 for simplicity. Note that the ceiling of second exhaust transport 220 is omitted in FIG. 2 so that the flow path of exhaust gases can be seen.

Second exhaust transport 220 is configured to (e.g., quietly and safely) exhaust gases from power generation transport 105. Second exhaust transport 220 includes a base frame 235, a stack base 225, a stack extension 230, and exhaust inlet 240. Exhaust inlet 240 couples to the first transverse end 173 to receive exhaust gases from power generation transport 105. For example, exhaust inlet 240 is coupled to and/or arranged to receive gases from exhaust collector 147 and exhaust port 135. Gases then flow horizontally through stack base 225 (which is coupled to base frame 235), then flow vertically upward through the stack extension 230, and are then released into the environment. In some embodiments, the stack base 225 and/or the stack extension 230 include internal silencers configured to silence or reduce the noise of exhaust gases flowing through second exhaust transport 220.

In the example of FIG. 2, the stack extension 230 is in an extended state. However, the stack extension 230 can be retracted downward and housed within the stack base 225 (e.g., during a transportation mode of the second exhaust transport 220). Stack extension 230 can extend vertically upward by a predetermined vertical distance (e.g., around eight and a half feet) e.g., during an operation mode. Said differently, stack extension 230 can telescope or slide out from the top of stack base 225 to be projected to a predetermined vertical distance (e.g., as illustrated in FIG. 2). The telescoping movement of the stack extension 230 may be achieved by an actuation mechanism that is implemented using for example one or more hydraulics, pneumatics, electric motors, rack and pinion actuators, cylinder actuators, lift cable actuators, hand cranks, or any combination thereof.

In some embodiments, the telescoping movement of the stack extension 230 may involve multiple stages of stack extensions. For example, while the embodiment of FIG. 2 illustrates a single stage of stack extension, other embodiments may include two or more stages of extensions e.g., that can be housed within stack base 225. Such a configuration may allow the hot exhaust air to be released into the atmosphere at an even greater height.

Example Variable Bleed Valve Circulation Systems

Referring back to FIG. 1, the gas turbine 122 may include variable bleed valves. Variable bleed valves can help manage the airflow within the engine, for example, during low-speed operations, deceleration, and/or engine start-up. By opening the valves, a portion of the compressed air is bled off, reducing the pressure within the compressor and preventing surge or stall conditions. This controlled bleeding of air may help maintain compressor performance and may help gas turbine 122 operate smoothly across a range of speeds and power settings. An engine control module may control the valves during different stages of engine operation. In some embodiments, variable bleed valves are located between a low-pressure compressor (LPC) section and a high-pressure compressor (HPC) section of a compressor on gas turbine 122.

Air bled from the variable bleed valve may be hot (e.g., two hundred degrees Fahrenheit or more) and pressurized. Thus, it may be unsafe or undesirable for the air to be freely or uncontrollably bled. Uncontrolled bleeding of VBV air may also cause high levels of noise which may be undesirable.

In some cases, air from the variable bleed valves is directed to a vertical exhaust stack mounted on top of power generation transport 105. The stack may extend vertically (e.g., twenty to thirty feet upward) and release the bled air into the external environment. However, designing and manufacturing this vertical stack for a mobile power generation transport may be expensive. Furthermore, it may be time consuming and complicated to install (e.g., couple) the vertical stack to the power generation transport during a set up process and to later uninstall (e.g., decouple) the vertical stack from the power generation transport during a disassembling process. Thus, in some embodiments, the power generation transport 105 includes a variable bleed valve air circulation system that redirects bled air (a) into a flow path for combustion air entering the gas turbine 122 and/or (b) into a flow path of hot air exhaust exiting gas turbine 122. Among other advantages, a variable bleed valve air circulation system may be cheaper to design and manufacture. Furthermore, a variable bleed valve air circulation system may be a permanent component of the power generation transport 105 (e.g., the variable bleed valve air circulation system does not need to be installed during a set up process and/or uninstalled during a disassembling process).

FIG. 1I is a perspective diagram of the power generation transport 105 with a variable bleed valve air circulation system. In this example, the variable bleed valve air circulation system includes a first redirection duct 191 and a second redirection duct 192 (a redirection duct may be referred to as a variable bleed valve duct). In some other embodiments, a variable bleed valve air circulation system include one of the redirection ducts instead of both. Furthermore, although both of the redirection ducts are above gas turbine 122 in FIG. 1I, in other embodiments, a redirection duct may be at a side or below the gas turbine 122.

First redirection duct 191 receives air from the variable bleed valves at a first end and directs the bled air horizontally to a second end that terminates at the first transverse end 173 of power generation transport 105. Air exiting the second end of first redirection duct 191 is received by inlet 722 of first exhaust transport 120. For example, first redirection duct 191 is coupled to inlet 722. In some embodiments, the second end of first redirection duct 191 includes a check valve that reduces or prevents exhaust gas from flowing back into the first redirection duct 191.

Second redirection duct 192 receives air from the variable bleed valves and directs the bled air into inlet plenum 124. For example, redirection duct 192 includes an aperture or end that is coupled to an aperture or end of the inlet plenum 124, enabling bled air to flow into inlet plenum 124 and re-enter the gas turbine 122. In some embodiments, the second redirection duct 192 includes a check valve that reduces or prevents air in the inlet plenum 124 from back-flowing to the bleed valves.

Although the above descriptions of variable bleed valve air circulation systems are in the context of the power generation system 100 of FIG. 1, the power generation system 200 of FIG. 2 may include a variable bleed valve air circulation system as well, for example with a first or second redirection duct.

Other Example Power Generation Systems

Figure 3A:
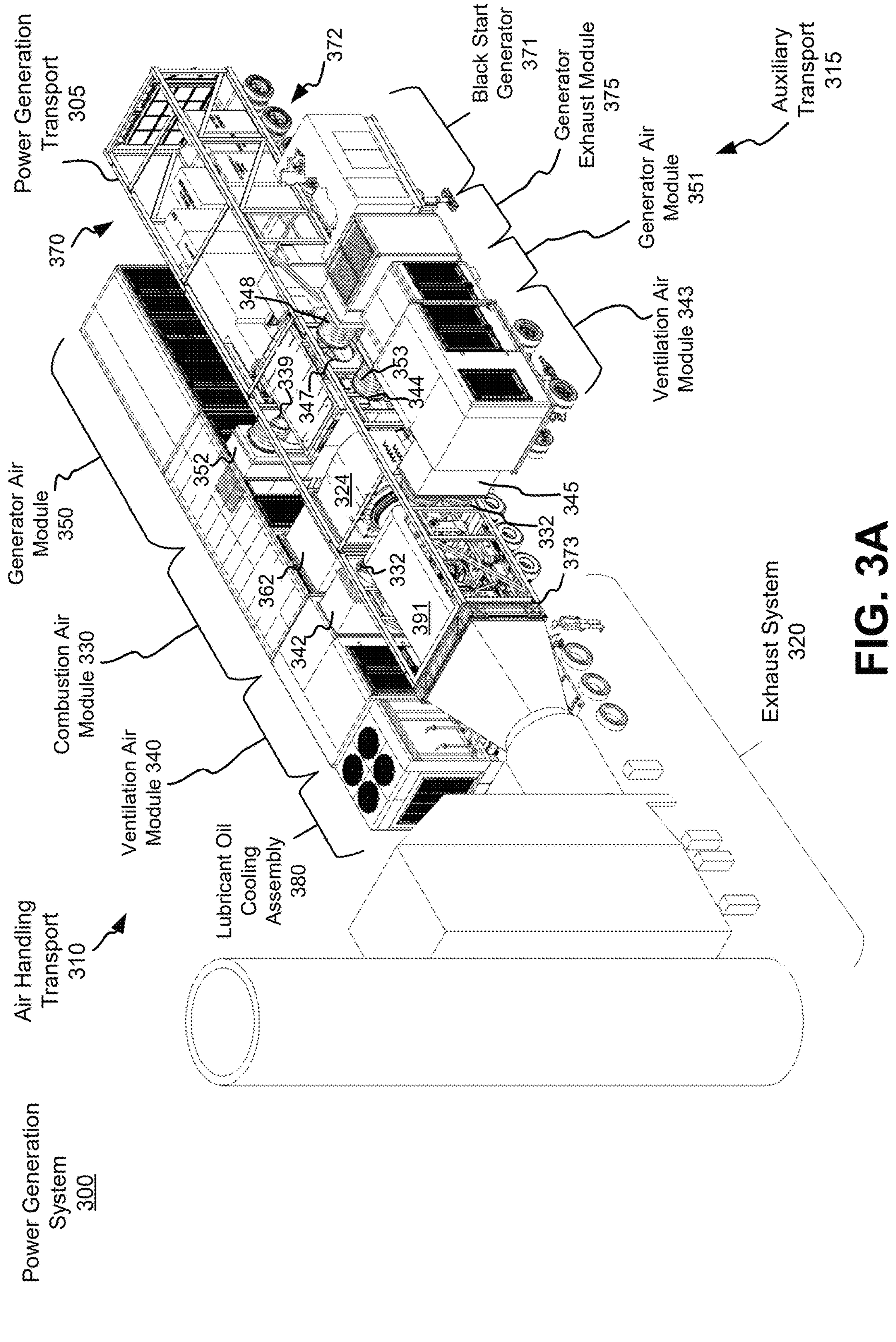
FIGS. 3A-3B are schematic diagrams of another power generation system, according to one or more embodiments.
Figure 3B:
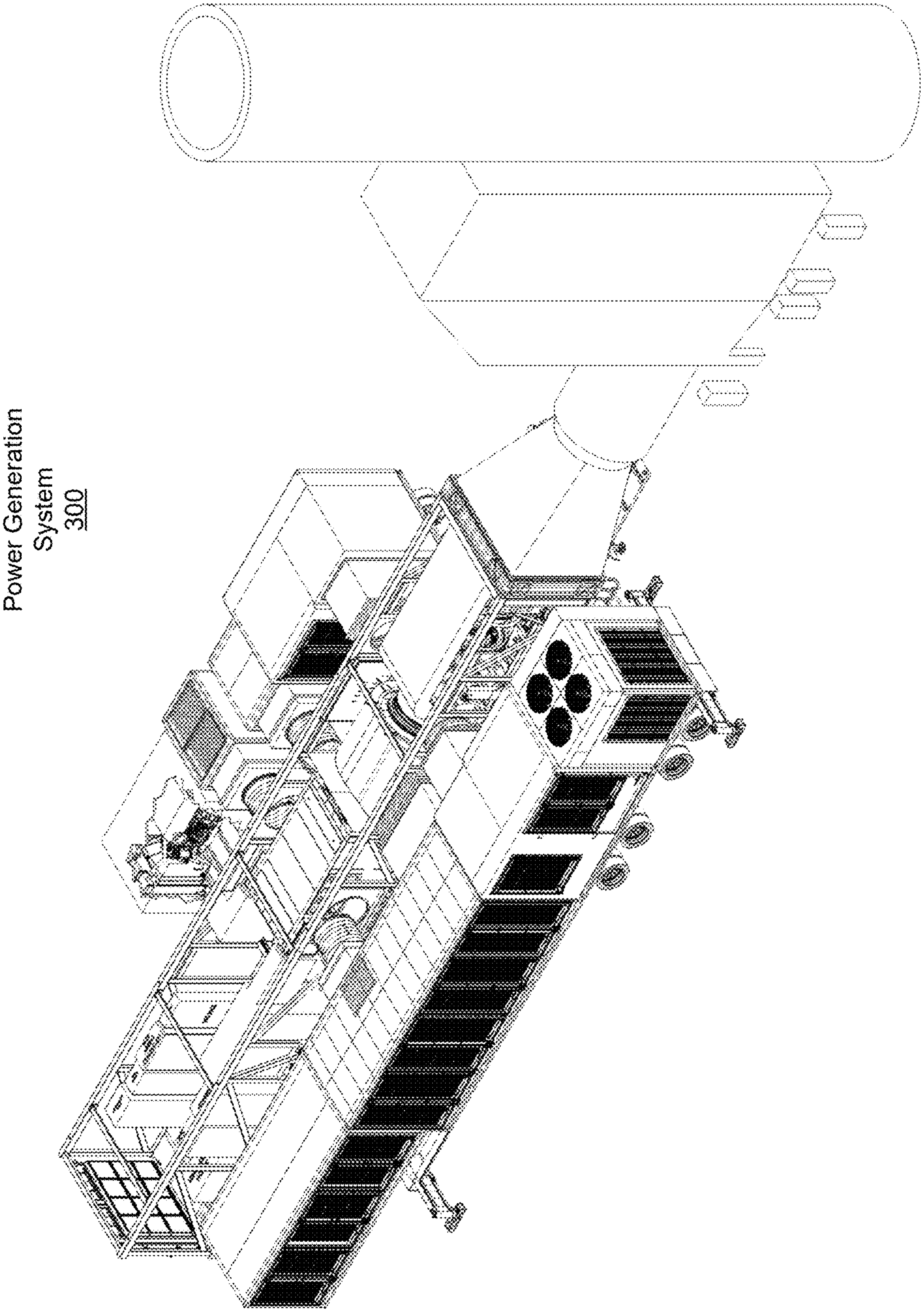

FIGS. 3A-3B ("FIG. 3" collectively) are perspective views of another mobile power generation system 300, according to one or more embodiments (note that many reference labels are omitted from FIG. 3B for simplicity). Power generation system 300 includes air handling transport 310, power generation transport 305, exhaust system 320, and auxiliary transport 315. Power generation system 300 may be referred to as a "three transport system" since the illustrated components are part of three separate transports which are aligned with each other (in this example, the exhaust system 320 is not a transport).

In the example of FIG. 3, the air handling transport 310 include a lubricant oil cooling assembly 380 (similar to 180), a ventilation air module 340 (similar to 140), a combustion air module 330 (similar to 130), and a generator air module 350 (similar to 150). Furthermore, the auxiliary transport 315 includes a ventilation air module 343 (similar to 143), another generator air module 351 (similar to 150), a generator exhaust module 375, and a black start generator 371 (similar to 171). The generator exhaust module 375 is configured to receive exhaust ventilation air from the generator enclosure and direct it into the external environment (in this example, generator exhaust module 375 directs the exhaust air upward through a top vent). The generator exhaust module 375 may include one or more silencers to reduce the noise of the exhaust air flowing into the external environment (thus, a generator exhaust module may also be referred to as a "generator exhaust silencer module").

The power generation transport 305 is similar to the power generation transport 105 in that it includes a turbine (not labeled), a turbine enclosure (not labeled), a generator (not labeled), a generator enclosure (not labeled), a first intake 332 to configured to couple to a ventilation air plenum 342 of the ventilation air module 340, a second intake 332 configured to couple to a ventilation air plenum 345 of the ventilation air module 343, and an inlet plenum 324 configured to couple to a combustion air plenum 362 of the combustion air module 330.

Since the air handling transport 310 includes a generator air module 350, the power generation transport 305 includes a third intake 339 on the first lateral side 370. The third intake 339 is configured to couple to a ventilation air plenum 352 of the generator air module 350.

Also, since auxiliary transport 315 includes the generator air module 351, the power generation transport 305 includes a fourth intake 344 on the second lateral side 372. The second lateral side 372 is configured to couple to a ventilation air plenum 353 of the generator air module 351. Additionally, since auxiliary transport 315 includes the generator exhaust module 375, the power generation transport 305 includes exhaust port 347 configured to couple to exhaust plenum 348 of the generator exhaust module 375. Note that in FIG. 3 several of the plenums (e.g., 352 and 348) are illustrated offset from their corresponding intakes (e.g., 339 and 347) so that those corresponding intakes can be seen. Additionally, power generation transport 305 includes a variable bleed valve circulation system with a second redirection duct 391 configured to direct bleed air to an exhaust inlet (not labeled) of the exhaust system 320.

In the example of FIG. 3, the exhaust system 320 is an SCR system (e.g., permanently) installed at the site. However, in other embodiments, exhaust system 320 may be replaced with a mobile SCR system (e.g., 120), or the second exhaust transport 220. For example, see FIGS. 5A-5B which includes a exhaust transport 520 similar to second exhaust transport 220.

Figure 4A:
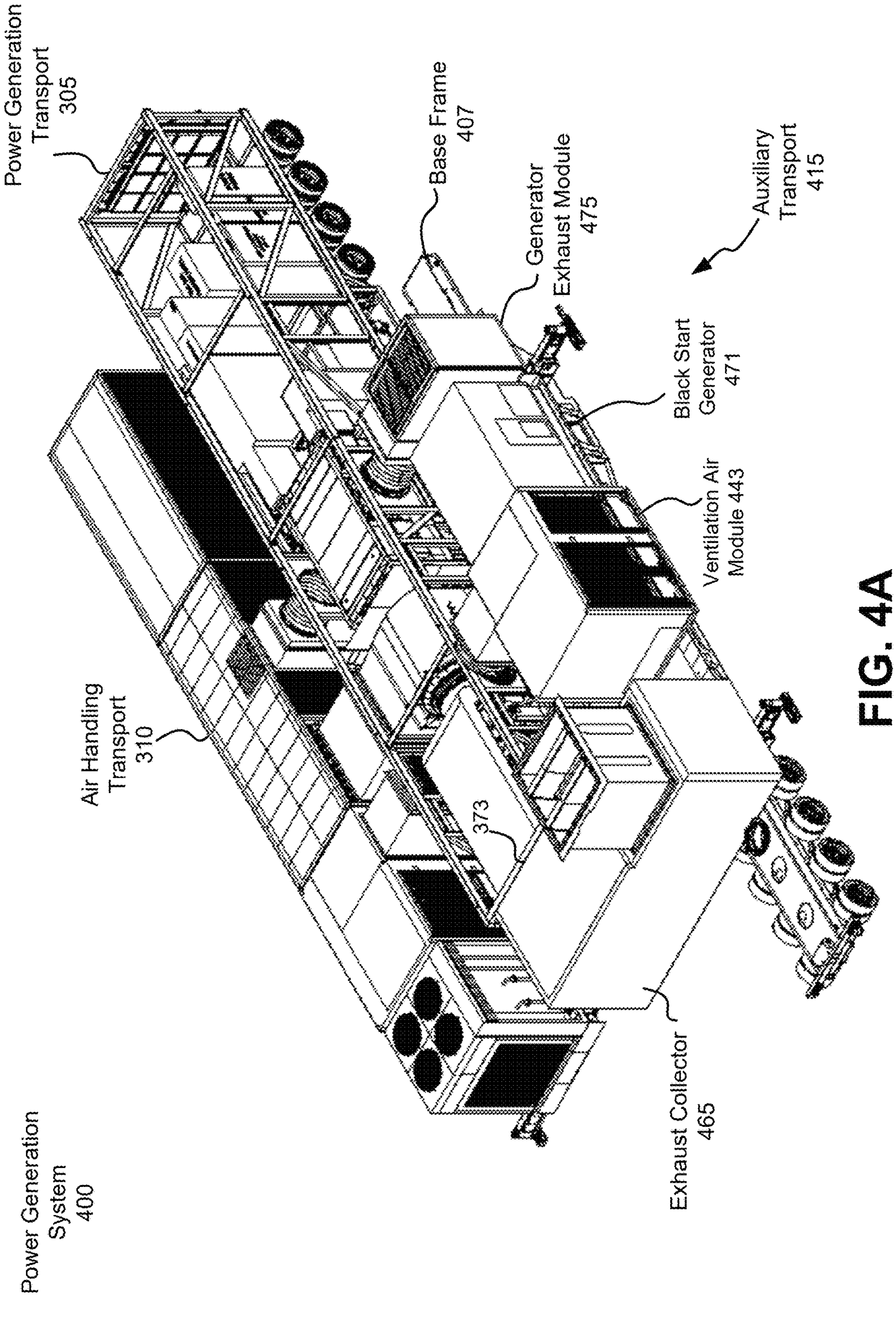
FIGS. 4A-4B are schematic diagrams of another power generation system, according to one or more embodiments.
Figure 4B:
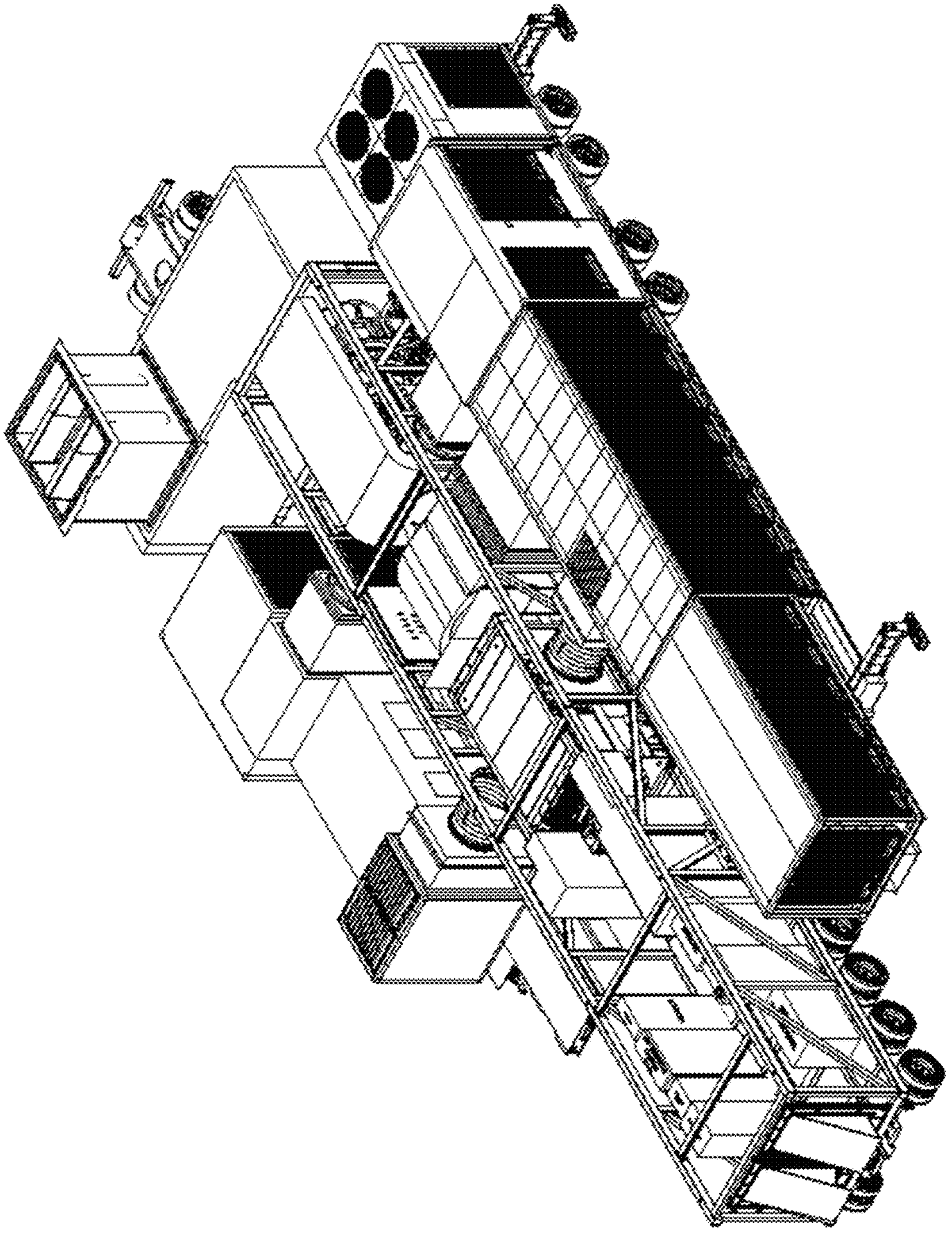

FIGS. 4A-4B ("FIG. 4" collectively) are perspective views of another power generation system 400, according to one or more embodiments (note that many reference labels are omitted from FIG. 4B for simplicity). Power generation system 400 may be referred to as a "three transport system" since the illustrated components are part of three separate transports which are aligned with each other.

Power generation system 400 is similar to power generation system 300, except it includes an exhaust system on the auxiliary transport. More specifically, auxiliary transport 415 includes an exhaust collector 465, a ventilation air module 443 (similar to 343), a black start generator 471 (similar to 371), and a generator exhaust module 475 (similar to 375) mounted to a base frame 407. Auxiliary transport 415 does not include a generator air module (e.g., 351) to provide space for the exhaust collector 465. Thus, fourth intake 344 of power generation transport 305 may be sealed or the power generation transport 305 in the example of FIG. 4 does not include a fourth intake 344.

FIG. 4 illustrates auxiliary transport 415 in an operational mode, where the exhaust collector 465 extends laterally from auxiliary transport 315 to couple to the first transverse end 373 of power generation transport 305. Exhaust collector 465 is similar to second exhaust transport 220 in that it has a stack base (not labeled) and a telescopic stack extension (not labeled), however the exhaust inlet is located on a lateral side of the stack base instead of at a transverse end of the stack base so that the exhaust inlet can coupled to the first transverse end 373. During a transportation mode, exhaust collector 465 may be rotated to be longitudinally aligned with the base frame 407 of the auxiliary transport 315.

Figure 5A:
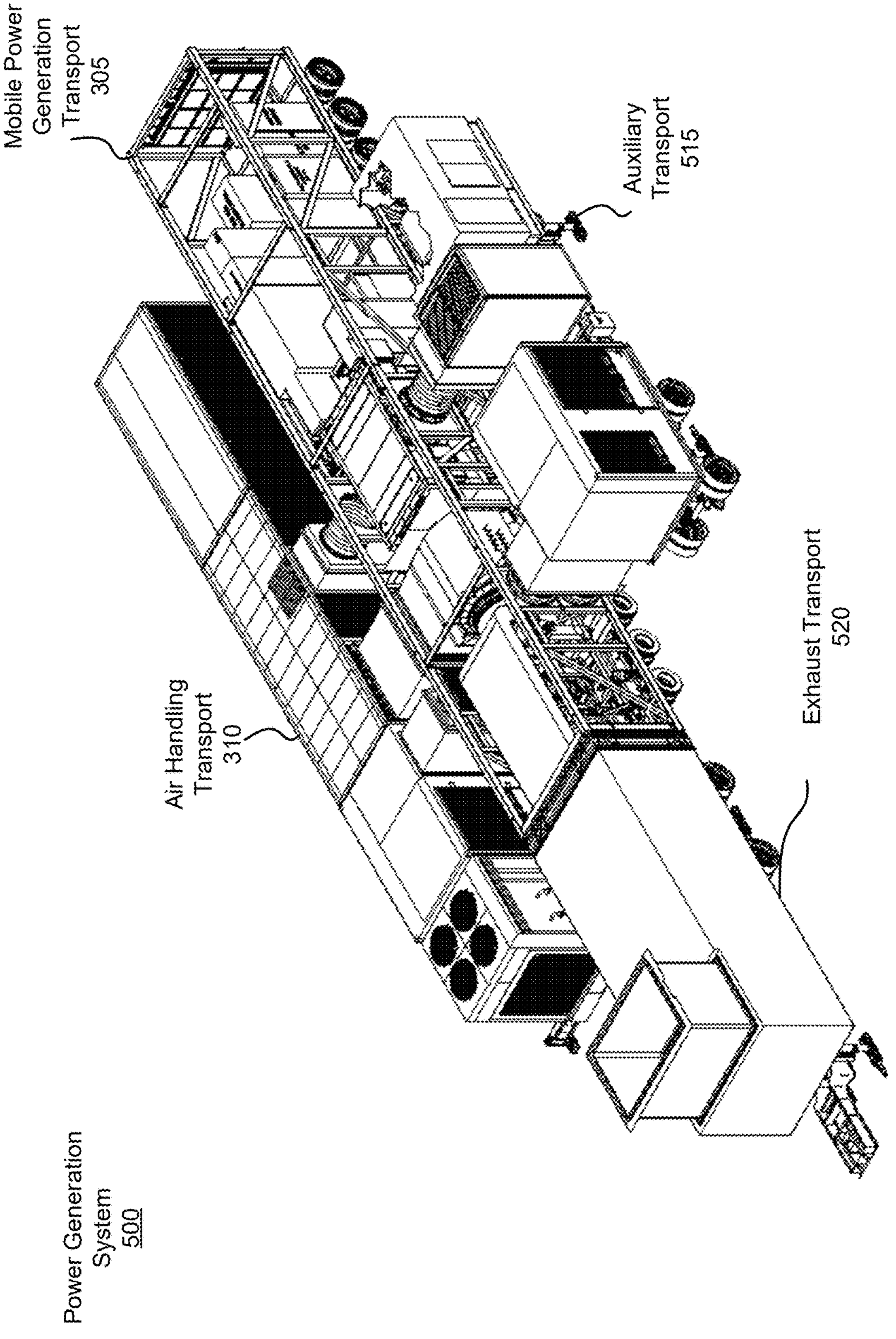
FIGS. 5A-5B are schematic diagrams of another power generation system, according to one or more embodiments.
Figure 5B:
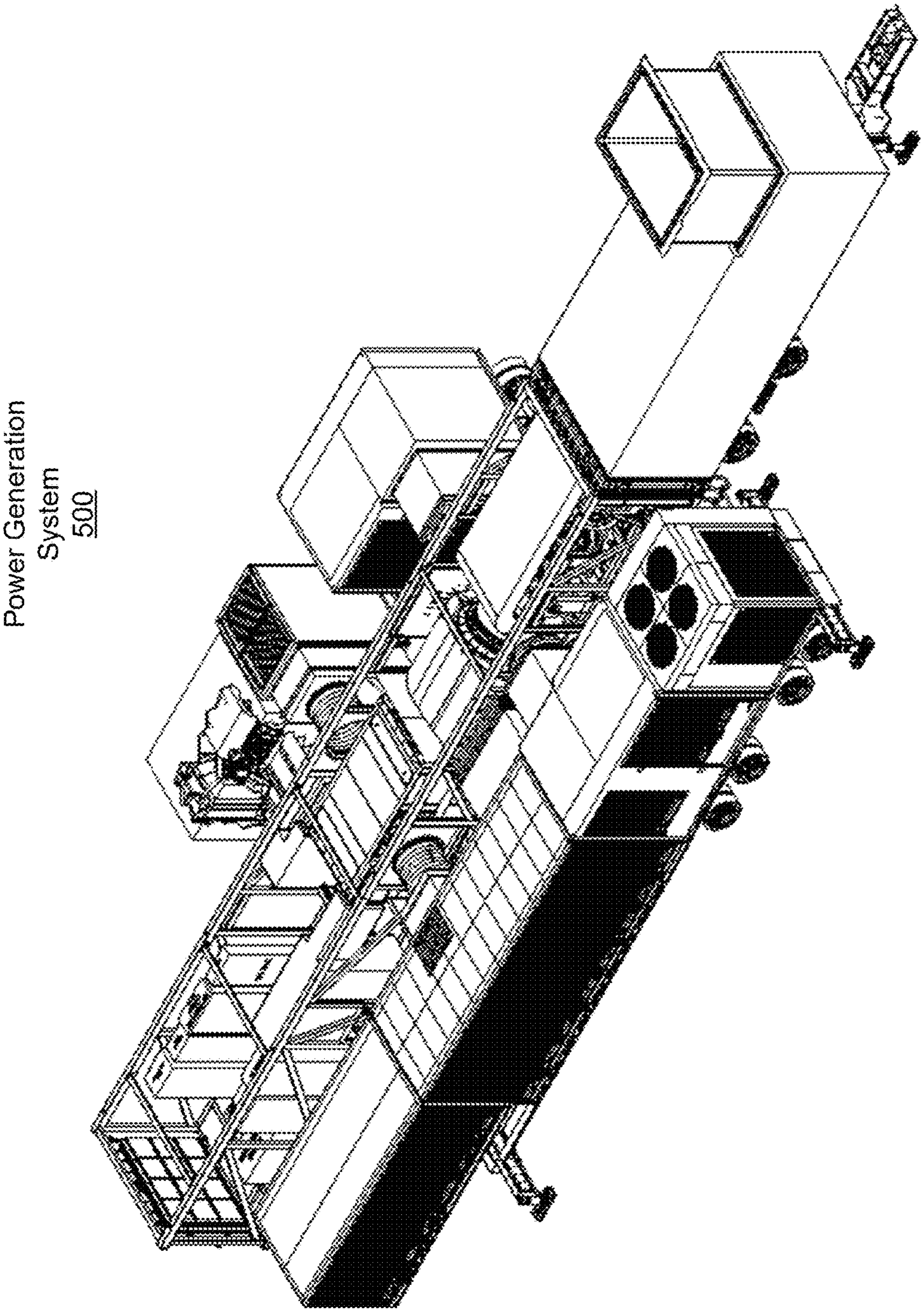

FIGS. 5A-5B ("FIG. 5" collectively) are perspective views of another power generation system 500, according to one or more embodiments (note that many reference labels are omitted from FIG. 5B for simplicity). Power generation system 500 is similar to power generation system 400, except it includes a different exhaust system (and the components of the auxiliary transport 515 are arranged in a different order and the auxiliary transport 515 is shorter). More specifically, power generation system 500 includes an exhaust transport 520, which is similar to the second exhaust transport 220. Power generation system 500 may be referred to as a "four-transport system" since the illustrated components are part of four separate transports which are aligned with each other.

Although the power generation systems 100, 200, 300, 400, 500 previously described include different components (e.g., transports), each of those systems are not limited to those specific components. Components (e.g., transports) of one system may be modified to be similar to components of other systems. For example, power generation system 100 can be modified such that lubricant oil cooling assembly 180 is on air handling transport 110 instead of on auxiliary transport 115 (e.g., see FIG. 3). Additionally, a component (e.g., a transport) of one system may be used (e.g., swapped or replaced) with a component of another system (e.g., with some modifications). For example, exhaust transport 520 of power generation system 500 may be replaced with first exhaust transport 120.

Example Methods of Producing Mobile Electric Power

Figure 6:
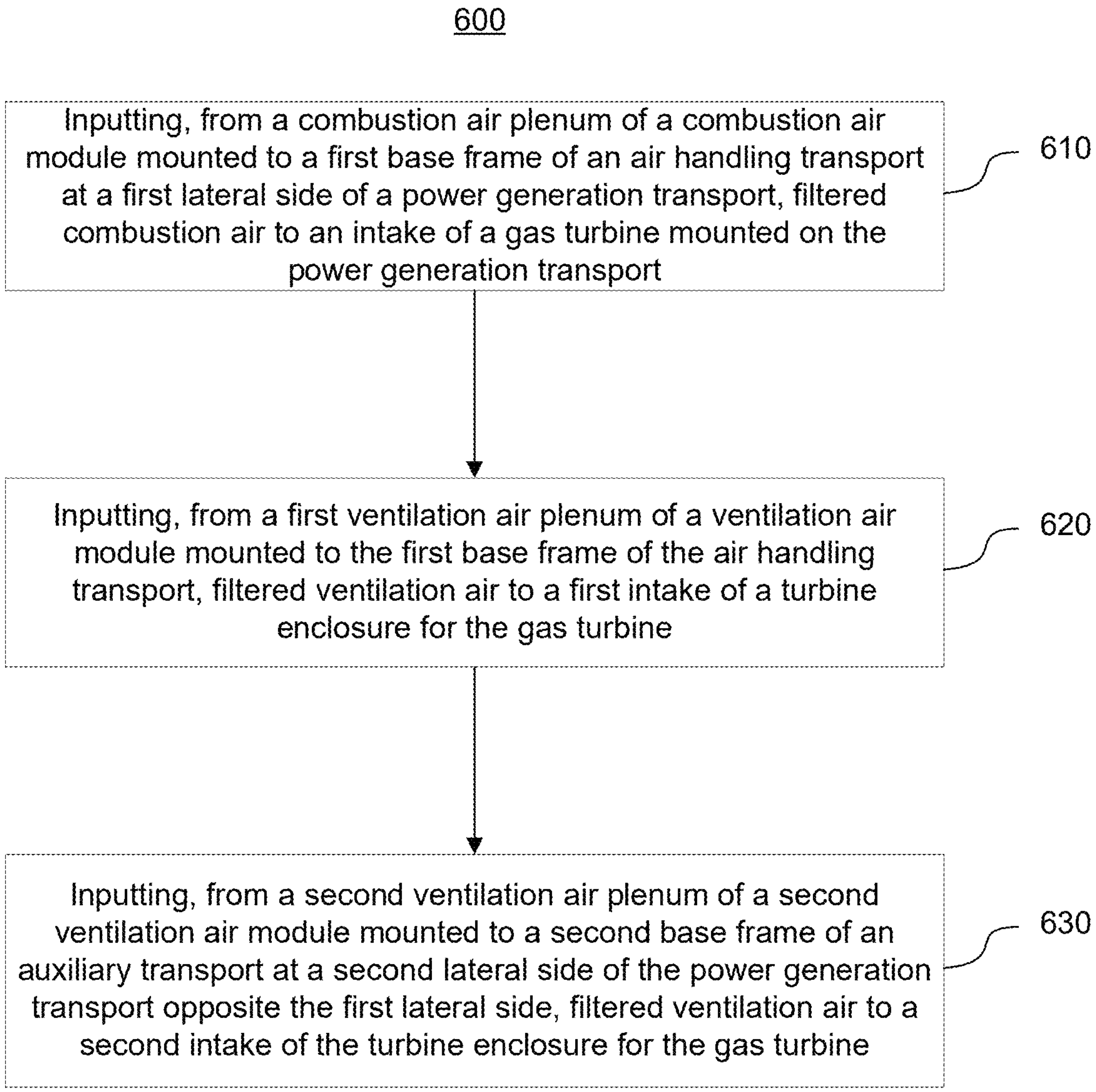
FIG. 6 is a flow chart illustrating a method for generating mobile electric power, in accordance with one or more embodiments.

FIG. 6 is a flow chart illustrating a method 600 for generating mobile electric power, in accordance with one or more embodiments. The steps of the method may be performed in different orders, and the method may include different, additional, or fewer steps.

At step 610, a combustion air plenum of a combustion air module mounted to a first base frame of an air handling transport at a first lateral side of a power generation transport inputs filtered combustion air to an intake of a gas turbine mounted on the power generation transport.

At step 620, a first ventilation air plenum of a ventilation air module mounted to the first base frame of the air handling transport, inputs filtered ventilation air to a first intake of a turbine enclosure for the gas turbine.

At step 630, a second ventilation air plenum of a second ventilation air module mounted to a second base frame of an auxiliary transport at a second lateral side of the power generation transport opposite the first lateral side, inputs filtered ventilation air to a second intake of the turbine enclosure for the gas turbine.

In some embodiments, the method 600 further includes inputting, from a third ventilation air plenum mounted to the second base frame of the auxiliary transport, filtered ventilation air to a third intake of a generator enclosure for a generator on the power generation transport.

In some embodiments, the method 600 further includes outputting, from an exhaust collector coupled to the gas turbine and positioned at a transverse end of the power generation transport between the first lateral side and the second lateral side, exhaust air from the gas turbine to an exhaust inlet of an exhaust transport (e.g., an exhaust plenum of the exhaust transport).

In some embodiments, the method 600 further includes outputting, from an exhaust port of the turbine enclosure housing and positioned at the transverse end of the power generation transport, exhaust ventilation air to the exhaust inlet of the exhaust transport.

In some embodiments, the method 600 further includes outputting, from a generator exhaust plenum with a first end coupled to an exhaust port of a generator enclosure housing a generator coupled to the gas turbine, exhaust ventilation air from the generator enclosure to an exhaust inlet of an exhaust transport.

Additional Descriptions of Power Generation Systems

Some embodiments relate to a power generation transport configured to generate electric power, the power generation transport including: a base frame; a gas turbine mounted to the base frame; a generator mounted to the base frame; a turbine enclosure housing the gas turbine, the turbine enclosure including: a first intake on a first lateral side of the power generation transport, the first intake configured to couple to a first ventilation air plenum that provides filtered ventilation air from a first ventilation air module mounted on an air handling transport; and a second intake on second lateral side of the power generation transport opposite the first lateral side, the second intake configured to couple to a second ventilation air plenum that provides filtered ventilation air from a second ventilation air module mounted on an auxiliary transport; and an inlet plenum with an opening on the first lateral side of the power generation transport, the inlet plenum configured to (a) couple to a combustion air plenum that provides filtered combustion air from a combustion air module mounted to the air handling transport and (b) direct the filtered combustion air to an intake of the gas turbine.

In some embodiments, the power generation transport further includes: a generator enclosure housing the generator, the generator enclosure including a third intake on the second lateral side of the power generation transport, the third intake configured to couple to a third ventilation air plenum that provides filtered ventilation air from a generator air module mounted on the auxiliary transport. In some embodiments, the power generation transport further includes a generator exhaust plenum with a first end coupled to an exhaust port of the generator enclosure, the generator exhaust plenum configured to direct exhaust ventilation air from the generator enclosure to an exhaust inlet of an exhaust transport (e.g., an exhaust plenum of the exhaust transport).

In some embodiments, the gas turbine includes an exhaust collector positioned at a transverse end of the power generation transport between the first lateral side and the second lateral side, the exhaust collector configured to provide exhaust gas generated by the gas turbine to an exhaust inlet of an exhaust transport.

In some embodiments, the power generation transport further includes: a variable bleed valve duct configured to receive air bled from the gas turbine and direct it to at least one of: the exhaust inlet of the exhaust transport; or the inlet plenum configured.

In some embodiments, the turbine enclosure further includes: an exhaust port positioned at the transverse end of the power generation transport, the exhaust port configured to provide exhaust ventilation air from the turbine enclosure to the exhaust inlet of the exhaust transport.

Some embodiments relate to a system for generating mobile electric power, the system including: a power generation transport including: a gas turbine; and a generator; an air handling transport at a first lateral side of the power generation transport, the air handling transport including: a first base frame; a first ventilation air module mounted to the first base frame, the first ventilation air module configured to provide filtered ventilation air to a turbine enclosure housing the gas turbine via a first ventilation air plenum; and a combustion air module mounted to the first base frame, the combustion air module configured to provide filtered combustion air to the gas turbine via a combustion air plenum; and an auxiliary transport at a second lateral side of the power generation transport opposite the first lateral side, the auxiliary transport including: a second base frame; and a second ventilation air module mounted to the second base frame, the second ventilation air module configured to provide filtered ventilation air to the turbine enclosure via a second ventilation air plenum.

In some embodiments, the auxiliary transport further includes: a generator air module mounted to the second base frame, the generator air module configured to provide filtered ventilation air to a generator enclosure housing the generator via third ventilation air plenum.

In some embodiments, the system further includes: an exhaust transport at a transverse end of the power generation transport between the first lateral side and the second lateral side of the power generation transport, the exhaust transport including an exhaust inlet (e.g., an exhaust plenum) configured to receive exhaust air generated by the gas turbine.

In some embodiments, the exhaust inlet is further configured to receive exhaust ventilation air from the turbine enclosure.

In some embodiments, the power generation transport further includes: a generator exhaust plenum with a first end coupled to an exhaust port of a generator enclosure housing the generator, the generator exhaust plenum configured to direct exhaust ventilation air from the generator enclosure to an exhaust inlet of an exhaust transport.

In some embodiments, the system further includes: a black start generator mounted to the second base frame of the auxiliary transport, the black start generator configured to supply power to start the gas turbine of the power generation transport.

In some embodiments, the system further includes: a lubricant oil cooling assembly mounted to the second base frame of the auxiliary transport, the lubricant oil cooling assembly configured to provide lubricant to the gas turbine.

In some embodiments, the air handling transport and the auxiliary transport are substantially parallel (e.g., each is within 15 degrees) to the power generation transport.

In some embodiments, the power generation transport, air handling transport, and the auxiliary transport are independently movable during transportation.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A power generation transport configured to generate electric power, the power generation transport comprising:
- a base frame;
- a gas turbine mounted to the base frame;
- a generator mounted to the base frame;
- a turbine enclosure housing the gas turbine, the turbine enclosure comprising:
  - a first intake on a first lateral side of the power generation transport, the first intake configured to couple to a first ventilation air plenum that provides filtered ventilation air from a first ventilation air module mounted on an air handling transport; and
  - a second intake on second lateral side of the power generation transport opposite the first lateral side, the second intake configured to couple to a second ventilation air plenum that provides filtered ventilation air from a second ventilation air module mounted on an auxiliary transport; and
- an inlet plenum with an opening on the first lateral side of the power generation transport, the inlet plenum configured to (a) couple to a combustion air plenum that provides filtered combustion air from a combustion air module mounted to the air handling transport and (b) direct the filtered combustion air to an intake of the gas turbine.

2. The power generation transport of claim 1, further comprising:
- a generator enclosure housing the generator, the generator enclosure including a third intake on the second lateral side of the power generation transport, the third intake configured to couple to a third ventilation air plenum that provides filtered ventilation air from a generator air module mounted on the auxiliary transport.

3. The power generation transport of claim 2, further comprising a generator exhaust plenum with a first end coupled to an exhaust port of the generator enclosure, the generator exhaust plenum configured to direct exhaust ventilation air from the generator enclosure to an exhaust inlet of an exhaust transport.

4. The power generation transport of claim 1, wherein the gas turbine includes an exhaust collector positioned at a transverse end of the power generation transport between the first lateral side and the second lateral side, the exhaust collector configured to provide exhaust gas generated by the gas turbine to an exhaust inlet of an exhaust transport.

5. The power generation transport of claim 4, further comprising variable bleed valve duct configured to receive air bled from the gas turbine and direct it to at least one of:
- the exhaust inlet of the exhaust transport; or
- the inlet plenum.

6. The power generation transport of claim 4, wherein the turbine enclosure further comprises:
- an exhaust port positioned at the transverse end of the power generation transport, the exhaust port configured to provide exhaust ventilation air from the turbine enclosure to the exhaust inlet of the exhaust transport.

7. A system for generating mobile electric power, the system comprising:
- a power generation transport comprising:
  - a gas turbine; and
  - a generator;
- an air handling transport at a first lateral side of the power generation transport, the air handling transport comprising:
  - a first base frame;
  - a first ventilation air module mounted to the first base frame, the first ventilation air module configured to provide filtered ventilation air to a turbine enclosure housing the gas turbine via a first ventilation air plenum; and
  - a combustion air module mounted to the first base frame, the combustion air module configured to provide filtered combustion air to the gas turbine via a combustion air plenum; and
- an auxiliary transport at a second lateral side of the power generation transport opposite the first lateral side, the auxiliary transport comprising:
  - a second base frame; and
  - a second ventilation air module mounted to the second base frame, the second ventilation air module configured to provide filtered ventilation air to the turbine enclosure via a second ventilation air plenum.

8. The system of claim 7, wherein the auxiliary transport further comprises:

a generator air module mounted to the second base frame, the generator air module configured to provide filtered ventilation air to a generator enclosure housing the generator via third ventilation air plenum.

9. The system of claim 7, further comprising:

an exhaust transport at a transverse end of the power generation transport between the first lateral side and the second lateral side of the power generation transport, the exhaust transport comprising an exhaust inlet configured to receive exhaust air generated by the gas turbine.

10. The system of claim 9, wherein the exhaust inlet is further configured to receive exhaust ventilation air from the turbine enclosure.

11. The system of claim 7, wherein the power generation transport further comprises:

a generator exhaust plenum with a first end coupled to an exhaust port of a generator enclosure housing the generator, the generator exhaust plenum configured to direct exhaust ventilation air from the generator enclosure to an exhaust inlet of an exhaust transport.

12. The system of claim 7, further comprising:

a black start generator mounted to the second base frame of the auxiliary transport, the black start generator configured to supply power to start the gas turbine of the power generation transport.

13. The system of claim 7, further comprising:

a lubricant oil cooling assembly mounted to the second base frame of the auxiliary transport, the lubricant oil cooling assembly configured to provide lubricant to the gas turbine.

14. The system of claim 7, wherein the air handling transport and the auxiliary transport are substantially parallel to the power generation transport.

15. The system of claim 7, wherein the power generation transport, air handling transport, and the auxiliary transport are independently movable during transportation.

16. A method for generating mobile electric power, the method comprising:

inputting, from a combustion air plenum of a combustion air module mounted to a first base frame of an air handling transport at a first lateral side of a power generation transport, filtered combustion air to an intake of a gas turbine mounted on the power generation transport;

inputting, from a first ventilation air plenum of a ventilation air module mounted to the first base frame of the air handling transport, filtered ventilation air to a first intake of a turbine enclosure for the gas turbine; and inputting, from a second ventilation air plenum of a second ventilation air module mounted to a second base frame of an auxiliary transport at a second lateral side of the power generation transport opposite the first lateral side, filtered ventilation air to a second intake of the turbine enclosure for the gas turbine.

17. The method of claim 16, further comprising:

inputting, from a third ventilation air plenum mounted to the second base frame of the auxiliary transport, filtered ventilation air to a third intake of a generator enclosure for a generator on the power generation transport.

18. The method of claim 16, further comprising:

outputting, from an exhaust collector coupled to the gas turbine and positioned at a transverse end of the power generation transport between the first lateral side and the second lateral side, exhaust air from the gas turbine to an exhaust inlet of an exhaust transport.

19. The method of claim 18, further comprising:

outputting, from an exhaust port of the turbine enclosure housing and positioned at the transverse end of the power generation transport, exhaust ventilation air to the exhaust inlet of the exhaust transport.

20. The method of claim 16, further comprising:

outputting, from a generator exhaust plenum with a first end coupled to an exhaust port of a generator enclosure housing a generator coupled to the gas turbine, exhaust ventilation air from the generator enclosure to an exhaust inlet of an exhaust transport.

* * * * *